(12) United States Patent
De Marzi et al.

(10) Patent No.: US 6,594,794 B1
(45) Date of Patent: Jul. 15, 2003

(54) REED-SOLOMON DECODING OF DATA READ FROM DVD OR CD SUPPORTS

(75) Inventors: Giuseppe De Marzi, Milan (IT); Giancarlo Andolina, Concorezzo (IT); Roberto Ugioli, Paderno Dugnano (IT); Filippo Brenna, Besana Brianza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/424,144

(22) PCT Filed: Mar. 18, 1998

(86) PCT No.: PCT/IT98/00056
§ 371 (c)(1),
(2), (4) Date: Nov. 18, 1999

(87) PCT Pub. No.: WO99/48097
PCT Pub. Date: Sep. 23, 1999

(51) Int. Cl.[7] .............................................. H03M 13/00
(52) U.S. Cl. ..................................................... 714/784
(58) Field of Search ................................ 714/784, 781, 714/752, 756, 762

(56) References Cited

U.S. PATENT DOCUMENTS 4,852,099 A * 7/1989 Ozaki ........................ 714/756
6,003,151 A * 12/1999 Chuang ...................... 714/752
6,041,431 A * 3/2000 Goldstein ................... 714/784
6,122,766 A * 9/2000 Fukuoka et al. ............ 714/784
6,158,040 A * 12/2000 Ho ............................. 714/770

* cited by examiner

Primary Examiner—Albert Decady
Assistant Examiner—Esaw Abraham
(74) Attorney, Agent, or Firm—Allen, Dyer, Doppelt, Milbrath & Gilchrist, P.A.; Lisa K. Jorgenson

(57) ABSTRACT

An effective organization and transferring of data among the functional blocks of an integrated system of a read channel of data recorded on DVD-Rom, DVD-Ram, DVD-R or CD Rom for performing Reed-Solomon decoding including off-line heroic correction, or deinterleaving, Reed-Solomon decoding is provided. The integrated system includes an input buffer, an interface with a microcontroller bus, a Reed-Solomon decoder, an embedded RAM accessed through a 17-bit bus, a descrambling and EDC control block for DVD modes of operation, a descrambling block for CD codes of operations, a data output interface, and a timing control block. The system permits the de coding of the input data acquired through the input buffer at a rate of up to four-times the reference bit rate of DVD formatted data using a clock for accessing the embedded RAM having a frequency half that of the clock that is used in the Reed-Solomon decoder, while reducing the number of accesses to the embedded RAM needed to perform the decoding.

4 Claims, 22 Drawing Sheets

| | DRAM1 | | | | DRAM2 | | | | DRAM3 | | | |
|---|---|---|---|---|---|---|---|---|---|---|---|---|
| p#0 | $R0_{0..15}$ | $R1_{0..15}$ | $R2_{0..15}$ | $R3_{0..15}$ | $R4_{0..15}$ | $R5_{0..15}$ | $R6_{0..15}$ | $R7_{0..15}$ | $R8_{0..15}$ | $R9_{0..15}$ | $R10_{0..15}$ | $R11_{0..15}$ |
| p#1 | $R8_{16..31}$ | $R9_{16..31}$ | $R10_{16..31}$ | $R11_{16..31}$ | $R0_{16..31}$ | $R1_{16..31}$ | $R2_{16..31}$ | $R3_{16..31}$ | $R4_{16..31}$ | $R5_{16..31}$ | $R6_{16..31}$ | $R7_{16..31}$ |
| p#10 | $R8_{160..175}$ | $R9_{160..175}$ | $R10_{160..175}$ | $R11_{160..175}$ | $R0_{160..175}$ | $R1_{160..175}$ | $R2_{160..175}$ | $R3_{160..175}$ | $R4_{160..175}$ | $R5_{160..175}$ | $R6_{160..175}$ | $R7_{160..175}$ |
| p#11 | $R4_{176..182}$ | $R5_{176..182}$ | $R6_{176..182}$ | $R7_{176..182}$ | $R8_{176..182}$ | $R9_{176..182}$ | $R10_{176..182}$ | $R11_{176..182}$ | $R0_{176..182}$ | $R1_{176..182}$ | $R2_{176..182}$ | $R3_{176..182}$ |
| p#12 | $R12_{0..15}$ | $R13_{0..15}$ | $R14_{0..15}$ | $R15_{0..15}$ | $R16_{0..15}$ | $R17_{0..15}$ | $R18_{0..15}$ | $R19_{0..15}$ | $R20_{0..15}$ | $R21_{0..15}$ | $R22_{0..15}$ | $R23_{0..15}$ |
| p#13 | $R20_{16..31}$ | $R21_{16..31}$ | $R22_{16..31}$ | $R23_{16..31}$ | $R12_{16..31}$ | $R13_{16..31}$ | $R14_{16..31}$ | $R15_{16..31}$ | $R16_{16..31}$ | $R17_{16..31}$ | $R18_{16..31}$ | $R19_{16..31}$ |
| p#22 | $R20_{160..175}$ | $R21_{160..175}$ | $R22_{160..175}$ | $R23_{160..175}$ | $R12_{160..175}$ | $R13_{160..175}$ | $R14_{160..175}$ | $R15_{160..175}$ | $R16_{160..175}$ | $R17_{160..175}$ | $R18_{160..175}$ | $R19_{160..175}$ |
| p#23 | $R16_{176..182}$ | $R17_{176..182}$ | $R18_{176..182}$ | $R19_{176..182}$ | $R20_{176..182}$ | $R21_{176..182}$ | $R22_{176..182}$ | $R23_{176..182}$ | $R12_{176..182}$ | $R13_{176..182}$ | $R14_{176..182}$ | $R15_{176..182}$ |
| p#203 | $R196_{176..182}$ | $R197_{176..182}$ | $R198_{176..182}$ | $R199_{176..182}$ | $R200_{176..182}$ | $R201_{176..182}$ | $R202_{176..182}$ | $R203_{176..182}$ | $R192_{176..182}$ | $R193_{176..182}$ | $R194_{176..182}$ | $R195_{176..182}$ |
| p#204 | $R204_{0..15}$ | $R205_{0..15}$ | $R206_{0..15}$ | $R207_{0..15}$ | $R208_{0..15}$ | | | | | | | |
| p#214 | | | | | $R204_{160..175}$ | $R205_{160..175}$ | $R206_{160..175}$ | $R207_{160..175}$ | $R208_{160..175}$ | | | |
| p#215 | $R208_{176..182}$ | | | | | | | | $R204_{176..182}$ | $R205_{176..182}$ | $R206_{176..182}$ | $R207_{176..182}$ |

FIGURE 14

WRITE R2 READ R00 = $R1_0\ R0_1\ R1_2\ R0_3$ -------- $R1_{28}\ R0_{29}\ R1_{30}\ R0_{31}$
WRITE R0 READ R11 = $R2_0\ R1_1\ R2_2\ R1_3$ -------- $R2_{28}\ R1_{29}\ R2_{30}\ R1_{31}$
WRITE R1 READ R22 = $R0_0\ R2_1\ R0_2\ R2_3$ -------- $R0_{28}\ R2_{29}\ R0_{30}\ R2_{31}$
WRITE R0 READ R33 = $R1_0\ R0_1\ R1_2\ R0_3$ -------- $R1_{28}\ R0_{29}\ R1_{30}\ R0_{31}$

FIGURE 20A

TABLE 1:

| PAGE | DRAM 1 | | DRAM 2 | |
|---|---|---|---|---|
| 0 | 1 | 9 | 5 | 13 |
| 1 | 2 | 10 | 6 | 14 |
| 2 | 3 | 11 | 7 | 15 |
| 3 | 4 | 12 | 8 | 16 |
| 4 | 17 | 25 | 21 | 29 |
| 5 | 18 | 26 | 22 | 30 |
| 6 | 19 | 27 | 23 | 31 |
| 7 | 20 | 28 | 24 | 32 |
| 8 | 33 | 41 | 37 | 45 |
| 9 | 34 | 42 | 38 | 46 |
| 10 | 35 | 43 | 39 | 47 |
| 11 | 36 | 44 | 40 | 48 |
| 12 | 49 | 57 | 53 | 61 |
| 13 | 50 | 58 | 54 | 62 |
| 14 | 51 | 59 | 55 | 63 |
| 15 | 52 | 60 | 56 | 64 |
| 16 | 65 | 73 | 69 | 77 |
| 17 | 66 | 74 | 70 | 78 |
| 18 | 67 | 75 | 71 | 79 |
| 19 | 68 | 76 | 72 | 80 |
| 20 | 81 | 89 | 85 | 93 |
| 21 | 82 | 90 | 86 | 94 |
| 22 | 83 | 91 | 87 | 95 |
| 23 | 84 | 92 | 88 | 96 |
| 24 | 97 | 105 | 101 | 109 |
| 25 | 98 | 106 | 102 | 110 |
| 26 | 99 | 107 | 103 | 111 |
| 27 | 100 | 108 | 104 | 112 |

*FIGURE 20B*

REED-SOLOMON DECODING OF DATA READ FROM DVD OR CD SUPPORTS

FIELD OF THE INVENTION

The present invention relates to a read-channel circuitry of data read from a mass memory support such as a DVD or a CD and more in particular to an integrated system for decoding according to the Reed-Solomon algorithm data read from a mass memory support coded according to standard DVD-ROM, DVD-R, DVD-RAM or CD-ROM protocols.

BACKGROUND

DVD and CD optical supports are more and more used for storing large quantities of data in PC's, digital audio and video playback systems and the like. The storing and reading of data to and from these supports imply the coding and decoding of data according to standard protocols that are defined at international level (e.g. ISO/IEC, CEI/IEC, etc.).

In write-read channel circuitry, reliability in terms of ability of detecting and correcting errors, especially during a phase of decoding of the coded data read from the support during a reading phase, and speed are of paramount importance. Obvious cost-effectiveness considerations call for the highest level of integration of system and/or subsystem circuitries in the minimum number of distinct integrated circuits. Multifunctional Reed-Solomon decoders, capable of handling either DVD decoding and correction or CIRC decoding and correction for all the commonly used CD-modes should be advantageously integrated in a single device including-an embedded RAM required for the decoding and correction operations on a bitstream of input data as produced by the data aquisition means of the read channel.

An architectural layout of such a multifunctional decoder ECC-IC is depicted in FIG. 1.

The integrated decoder handles CD modes bitstreams of any format as well as DVD-ROM, DVD-RAM and DVD-R mode bitstreams and advantageously should possess speed capabilities of handling bitstreams equivalent to a significantly large multiple of standard or base CD rates and of standard or base DVD rates.

With reference to the functional diagram of FIG. 1, the multifunctional integrated decoder ECC-IC, when operating in DVD mode, performs horizontal and vertical decoding of the input data stream and the decoded data are then descrambled and EDC checked before sending them to an output interface circuitry. When operating in a CD mode, the data are decoded and deinterleaved without performing any C3 decoding. Finally, when functioning in a BCA mode, the integrated decoder may perform a Burst Cutting Area decoding of the data stream.

The input data stream consists of the signals output by a data aquisition IC as depicted in FIG. 2. The signals contain data, information about the data and address information.

byte_clk [1]

The byte_clk (byte clock) signal indicates that the data byte can be read. It is generated once per data byte for 1 system clock cycle.

erasure [1]

The erasure bit is set to 1 if the current data byte is not a valid 16/8 modulation pattern (14/8 for CD)—if the pattern is valid, erasure is set to 0.

data [8]

The 8-bit data bus contains the demodulated data byte.

SID [4]

The 4-bit SID (sector ID) contains the 4 least significant bits of the logical sector ID. This signal provides the sector address within each block.

id_error [1]

An id_error bit of 0 indicates that the SD was decoded with no errors and no corrections. If the SID contained errors (no correction possible) or if a single error was corrected, the id_error bit is set to 1.

DVD/BCA frame_address[4:0] or CD S0/S1

In DVD modes the acquisition part keeps a memory of the syncs received and from this history extract the 5-bit frame address.

In BCA mode frame_address[3:0] depends from the sync found ($SB_{BCA}$, $RS_{BCA}1$, ..., $RS_{BCA}n$, $RS_{BCA}13$, $RS_{BCA}14$, $RS_{BCA}15$).

In CD mode the S0 and S1 signals are sent on frame_address[0] and frame_address[1] respectively.

CD nxfr [1] or DVD next_frame[1]

The DVD next_frame indicates that a new DVD frame is starting. The CD nxfr signal indicates that a new CD frame is starting. The BCA next_frame indicates that a BCA Re-sync has been found.

The timing diagrams of the input data aquisition for the case of operation in DVD mode and in CD mode are shown in FIGS. 3 and 4, respectively.

ECC-IC has two kinds of output interface: one for CD-modes (serial) and one for DVD-modes (parallel). In particular, the CD output interface may be a common $I^2S$ interface employing a format as depicted in FIG. 5, and the subcode interface has as format as depicted in FIG. 6.

The Reed-Solomon decoder block depicted in FIG. 7, supports five main modes:

| | |
|---|---|
| 1) DVD Outer code (208, 192, 17) | 8 errors or 16 erasures |
| 2) DVD Inner code (182, 172, 11) | 5 errors or 10 erasures |
| 3) CD C1 code (32, 28, 5) | 2 errors |
| 4) CD C2 code (28, 24, 5) | 2 errors or 4 erasures |
| 5) BCA code (52, 48, 5) | 2 errors or 4 erasures |

The number of erasures that can be corrected is programmable, depending on the mode, from 13 up to 16 for DVD Outer, from 7 up to 10 for DVD Inner, from 1 up to 4 for CD C2. The Reed-Solomon block can be programmed to make a severe check for "miscorrections": This preselection will cause a reduction of the decoding performance.

THE ERROR CORRECTION ALGORITHM

The complete algebraic decoding algorithm for the errors and the erasures is summarized in the following steps:

STEP 1. Calculation of the syndrome S(z), the erasure locator polynomial E(z) and the calculation of the modified syndrome T(z). If r(x) is the received code word $$S_j = \sum_{i=0}^{n-1} r_{n-1} \alpha^{ji}$$

If $\alpha^{jk}$ is the position of a k-erasure and e is the number of erasures $$E(z) = \prod_{k=1}^{e} (1 - z\alpha^{jk})$$

If t is the maximum number of errors the code is able to correct $$T(z) = S(z)E(z) \bmod(z^{2t})$$

STEP 2. Perform the extended Euclidean Algorithm (modified version) to calculate the error locator polynomial σ(z) and the error evaluator polynomial ω(z). Calculation of the new error locator polynomial Ψ(z)

$$\Psi(z) = \sigma(z)E(z)$$

STEP 3. Perform the Chien search to find the roots of the new error locator polynomial. The roots of this polynomial indicate the error and erasure positions in a received code word. Perform the Forney's algorithm to find the error and erasure values.

STEP 4. Check the decoding process and correct the received code word.

The timing control block sets the control inputs of the Reed-Solomon block and send start syndrome pulse (start_synd) with the first symbol of the code word.

The en_synd is acting as an enable for the data bus (data_in).

Every erasure should be flagged by erasure_pos. During the shifting of the code word, the Reed-Solomon calculates its syndrome and its erasure polynomial.

Once the code word is completely shifted into the Reed-Solomon, the controller has to start the Key Equation Solver (start_kes).

The Reed-Solomon responds when error and location values are ready for the controller (kesready).

The errors and error locations are stored in a Lifo and the controller can read them with read_pos and read_error signals.

The Reed Solomon processing consists of three main tasks:

a) syndrome and erasure polynomial calculation (invoked by start_synd)
b) key equation solving and error calculation (invoked by start_kes)
c) Chien & Forney (generating the ending signal kes_ready)

as depicted in the block diagram of FIG. 8.

In DVD Outer decoding, the erasure polynomial is equal for each column, because it is calculated using the incorrectable flag coming from the Inner decoding. For this reason it is calculated only once for each Ecc block of data at the beginning of the vertical decoding process; the resulting polynomial is stored depending on the store_eras_poly signal. This is depicted by way of a block diagram in FIG. 9.

During the DVD decoding process (Inner-Outer-Inner-Outer- . . . ) the signal sel_eras_poly send to Key Equation Solver the current erasure polynomial (Inner) or the previous stored erasure polynomial (Outer).

SUMMARY OF THE INVENTION

To overcome the intrinsic low speed of embedded DRAMs it has been found that a considerable increase of the required processing speed capabilities in a fully integrated decoder (ECC-IC) may be obtained by organizing the data flow within the integrated decoder and the embedded RAM in a way as to reduce the number of accesses to the embedded RAM needed to perfom the decoding at the required speed while using the Reed-Solomon decoding block at twice the maximum clock frequency allowed by the embedded RAM (25 MHz).

Accordingly, in DVD decoding, the syndrome engine is made capable to process two code words at the same time, by storing the final polynomials into distinct registers: two for storing vertical syndromes and one for storing horizontal syndromes, thus implementing a kind of parallel processing in the decoding phase.

Accordingly, in CD decoding, a new addressing scheme has been found to perform very high speed M2 deinterleaving, minimizing the number of accesses to the embedded DRAM required to perform the deinterleaving of data.

The embedded DRAM is organized in distinct banks, each divided into a number of pages of certain capacity of words, functioning in a synchronous page mode.

BRIEF DESCRIPTION OF THE DRAWINGS

FIG. 14 shows the particular mapping adopted for the embedded DRAM for one ECC-block of data;

FIG. 20 shows deinterleaved frames read from the DRAM;

Table 1 illustrates the particular mapping of the two banks of DRAM (M2-deinterleaving) refering to the input frame numbers.

Figure 21:
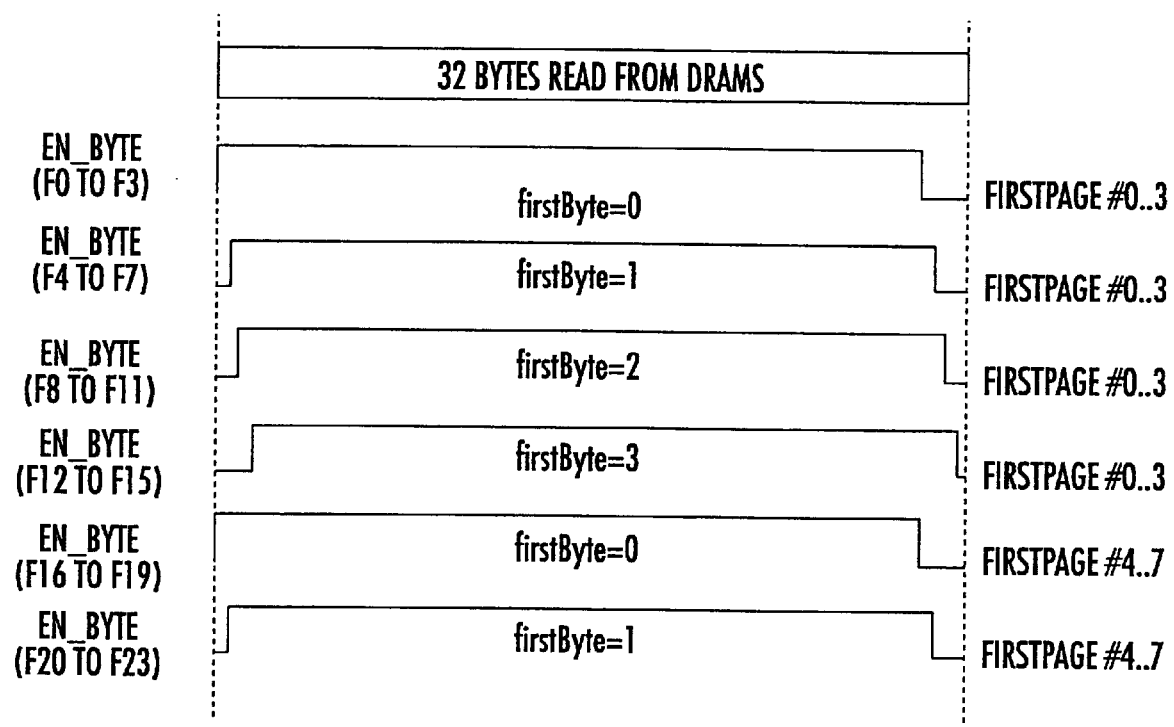
Figure 22:
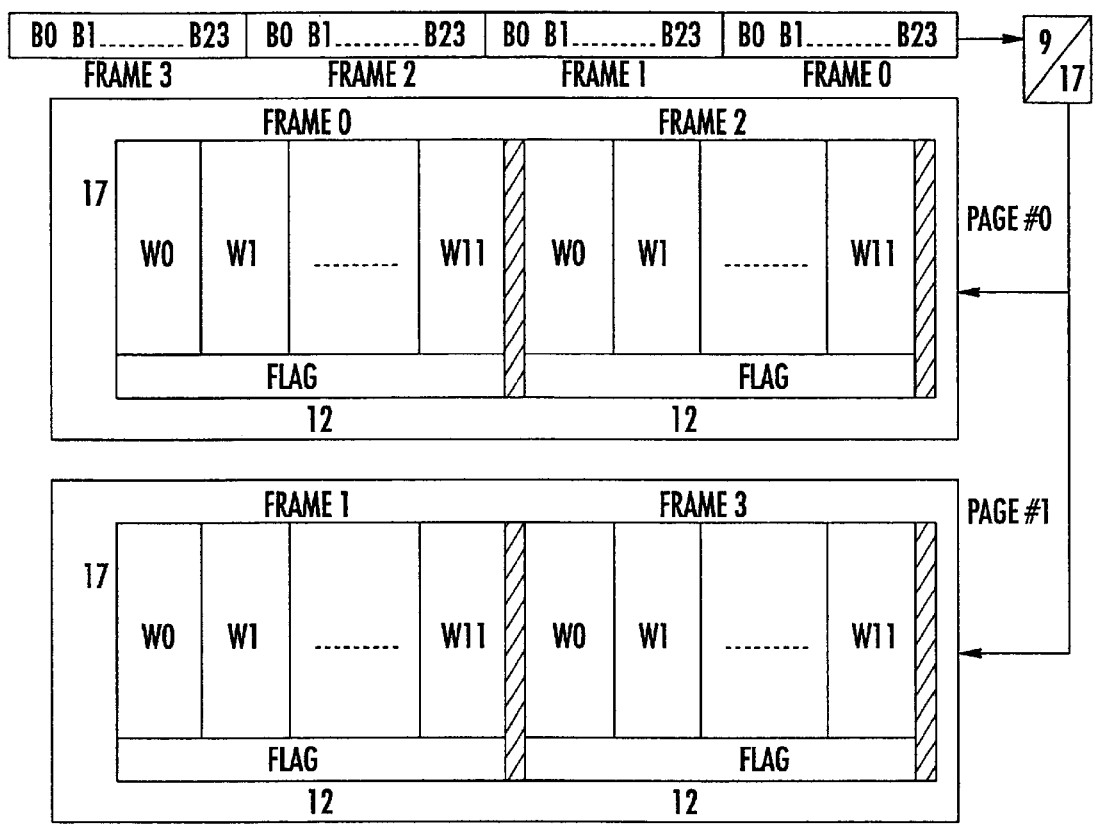
Figure 23:
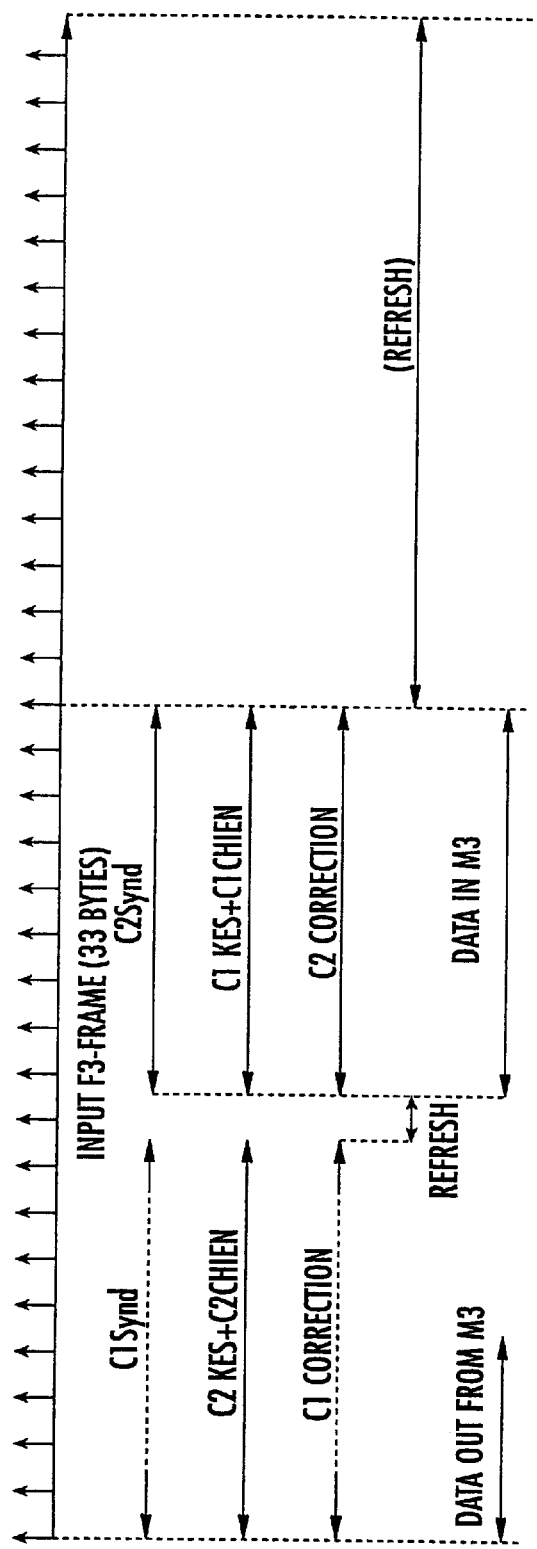
Figure 24:
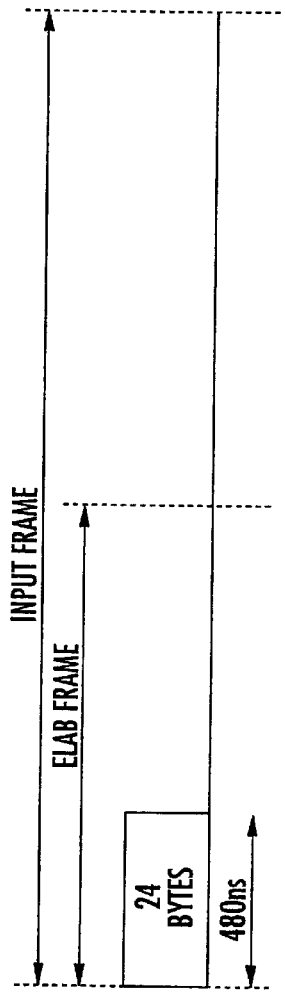
Figure 26:
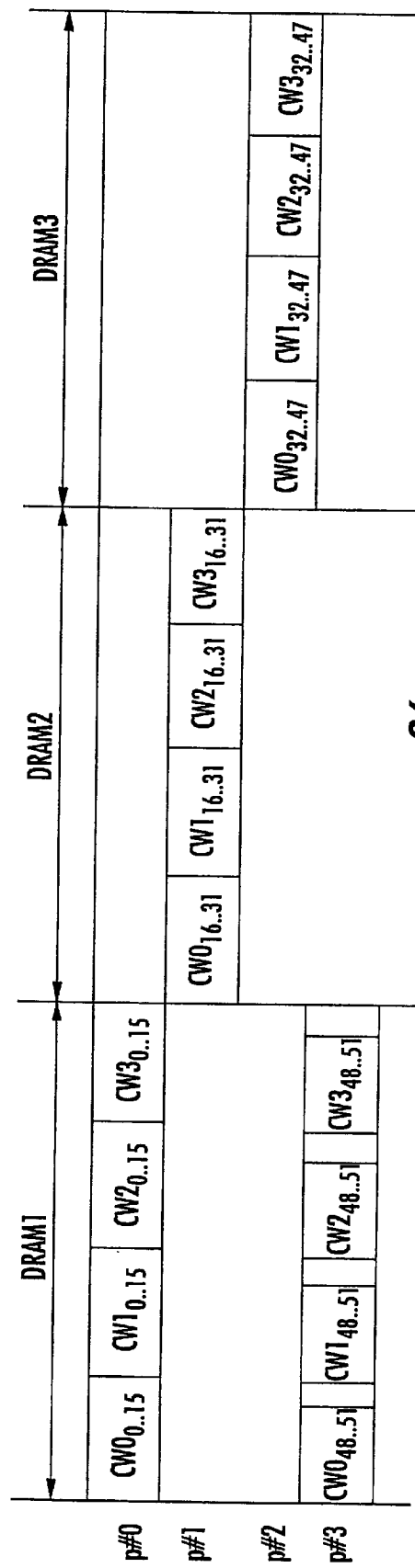
Figure 25:
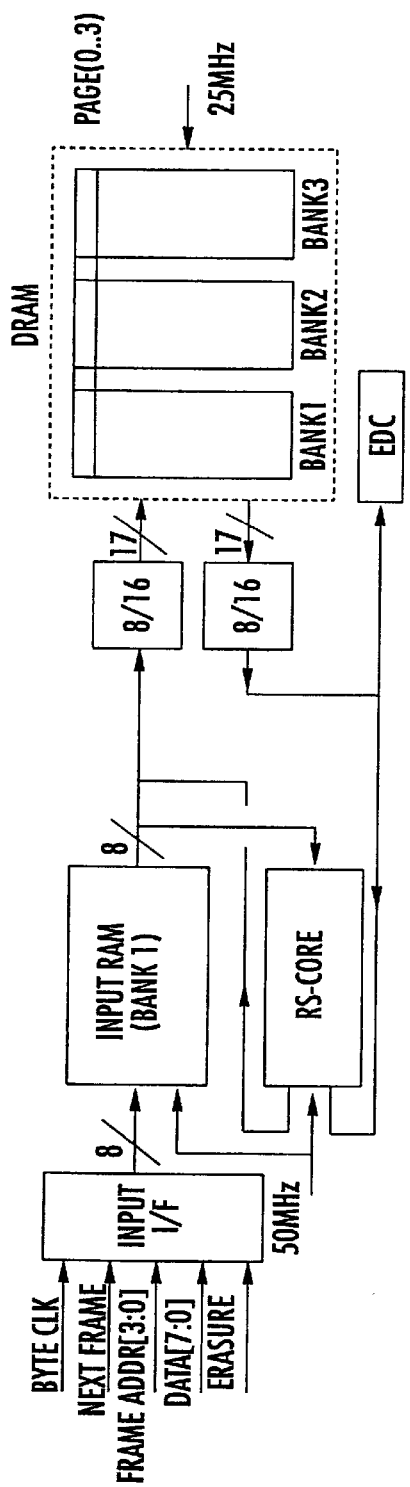
Figure 27:
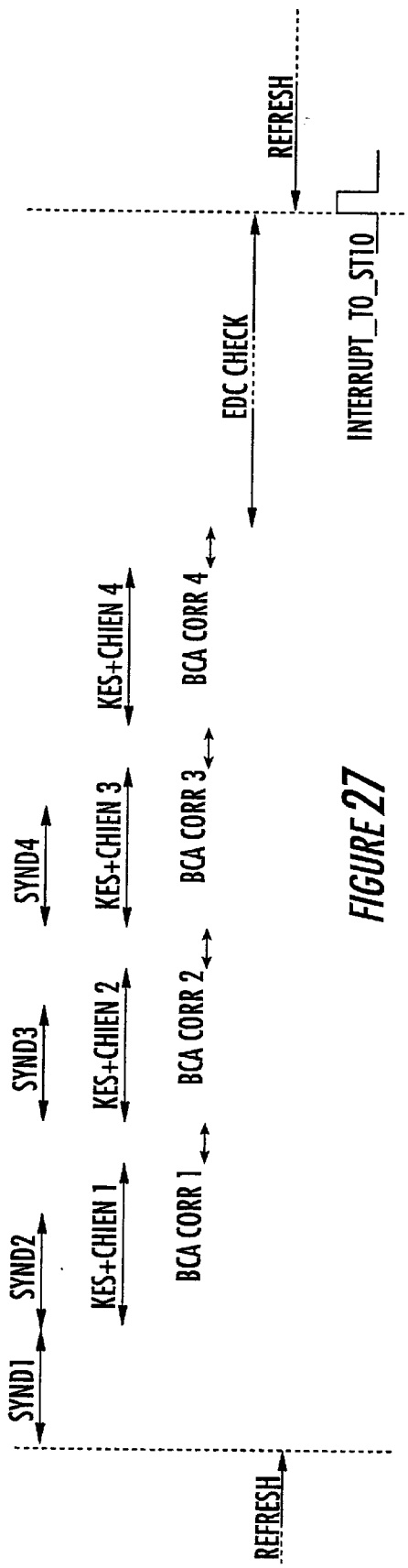

FIG. 21 depicts the enable signal according to the different frame numbers;

FIG. 22 shows the particular mapping inside a page of the embedded DRAM (M3-deinterleaving);

FIG. 23 illustrates schematically the different phases of processing (CD mode);

FIG. 24 illustrates how one block of 12 words is read from memory for each input frame;

FIG. 25 shows the functional blocks of the ECC-IC device that are involved with the data flow during operation in BCA mode;

FIG. 26 illustrates the mapping of the embedded DRAM (BCA mode);

FIG. 27 illustrates schematically the different phases of processing (BCA mode)

Figure 28:
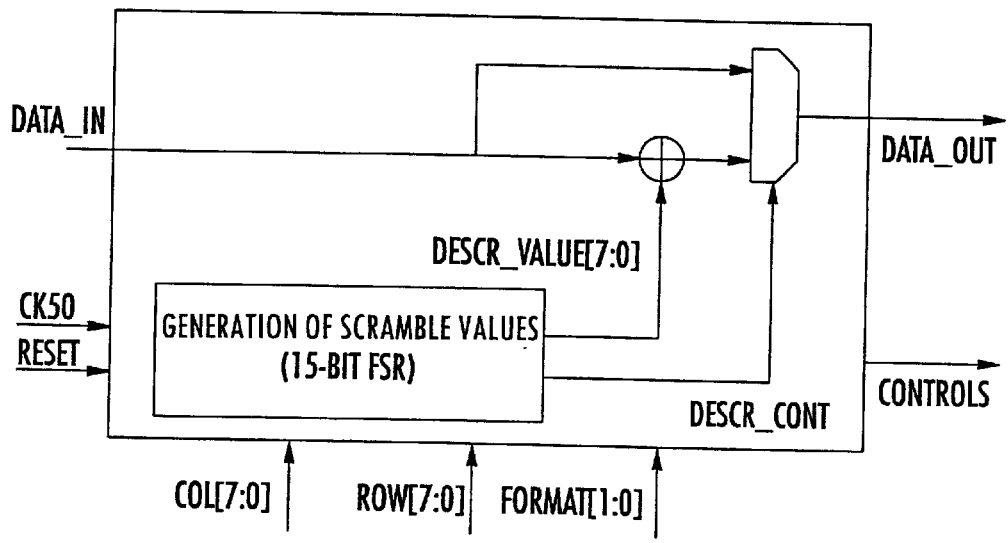
Figure 29:
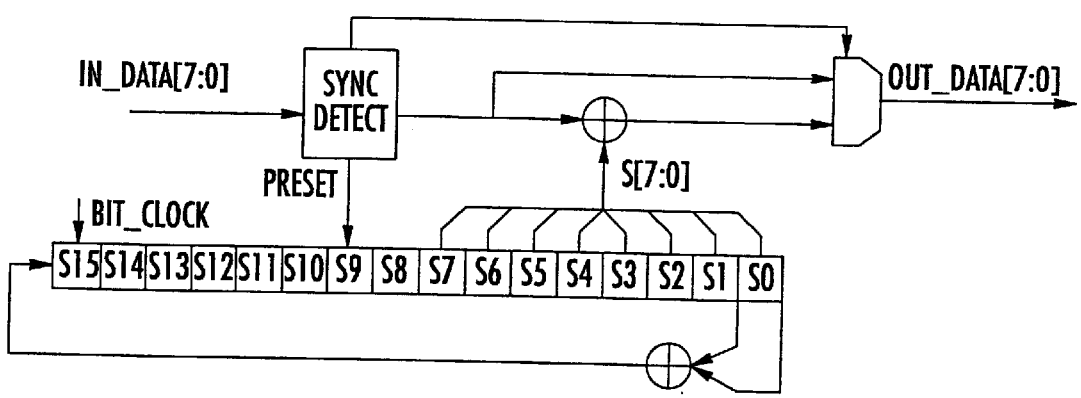
Figure 30:
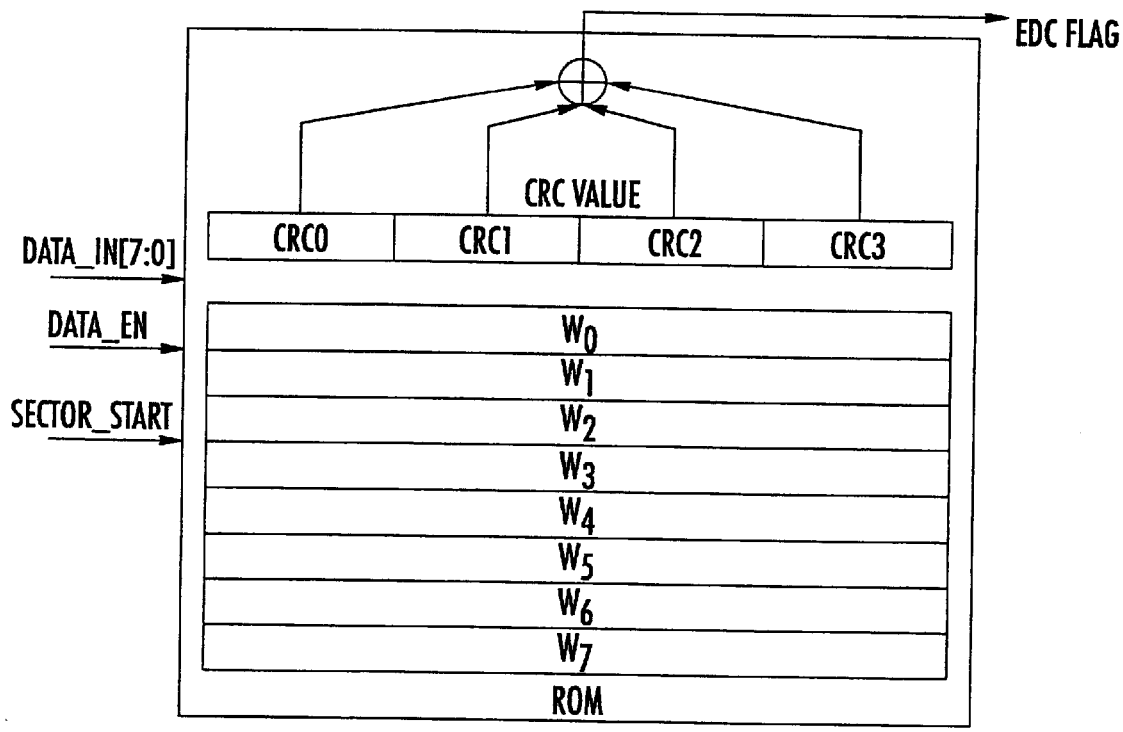
Figure 31:
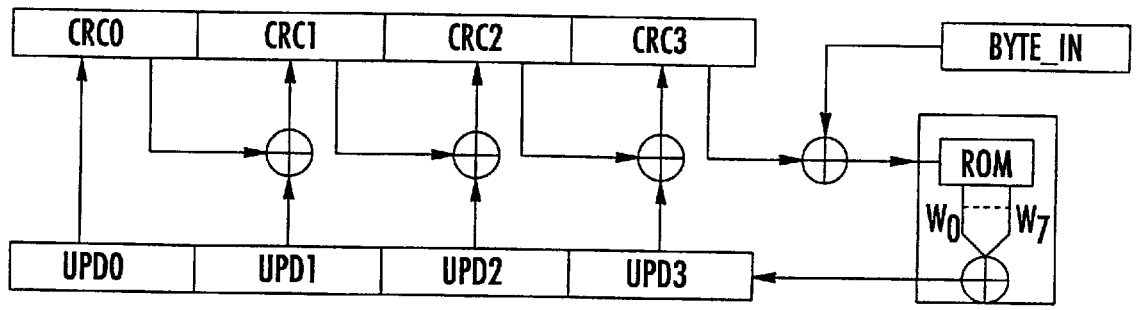

FIG. 28 depicts the descrambling architecture for DVD mode of operation;

FIG. 29 depicts the descrambling architecture for CD mode of operation;

FIG. 30 shows the functional block diagram of the EDC checker;

FIG. 31 depicts the way the new CRC value is produced by shifting the old value and xoring the result with the updating value.

DESCRIPTION OF AN EMBODIMENT OF THE INVENTION

An integrated multifunctional Reed-Solomon decoder according to the general characteristics already described above and embodying the features of the invention, implementing the method of the invention of organising and transferring data among the functional blocks of the integrated decoder will now be described with reference to the drawings.

Figure 10:
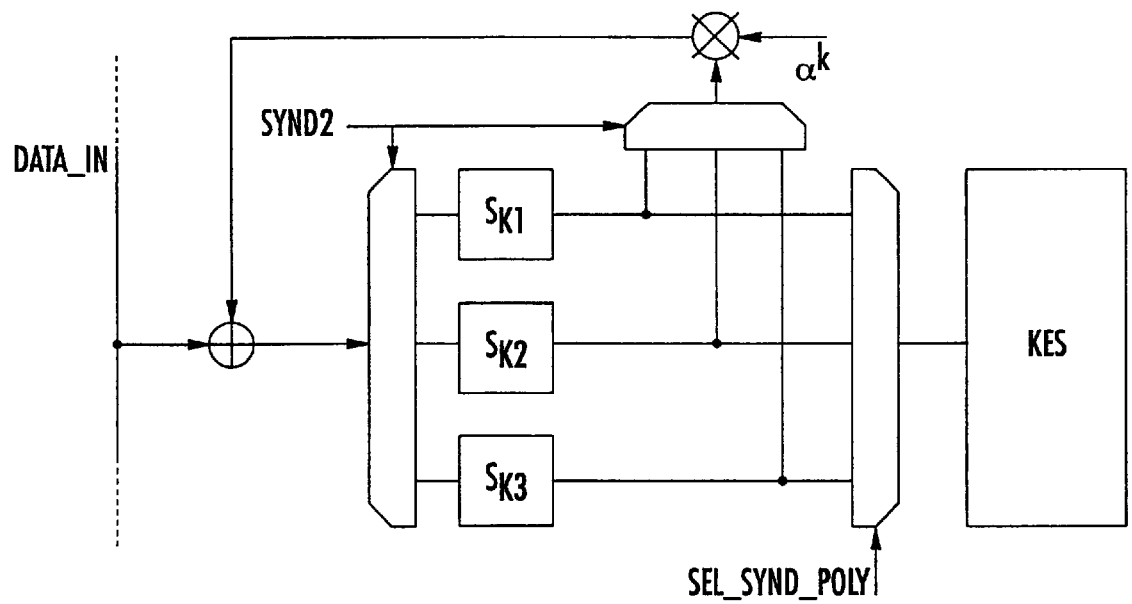
FIG. 10 shows the parallel processing of partial syndrome values.

With reference to the diagram of FIG. 10, the synd2 value (rs_reg[2]), if set, selects for each byte_clk a different syndrome register (SK1, SK2) to store the polynomials related to the two different columns. The sel_synd_poly signal chooses which one of the stored syndrome values is to be sent to Key Equation Solver (KES).

Timing Control Block

According to the sample embodiment taken into consideration, the following assumptions were made:

The system clock speed is 50 MHz.

The symbols coming from the data acquisition block are stored into an input memory working with the system 50 MHz clock.

The embedded DRAM works in a synchronous page mode with a 25 MHz clock.

DVD×4 and CD×32 are taken as target speed capabilities for the relative modes (two steps of decoding for DVD modes and complete CIRC decoding for CD modes).

The byte clock coming from the data acquisition device is always available.

At the output of ECC-IC only complete Ecc blocks of data will be output.

The characteristics of the DRAM embedded in the ECC-IC chip were the following:

1-Transistor Planar memory cell.

Planar Memory cell area: 11.2 mm2.

Organized in three banks of 16K words of 17 bits, split into 512 rows of 32 words of 17 bits.

Byte-Write capability available, i.e. write operation can be applied to any of the two bytes. Read operation is always done on 17 bits.

512-cycle refresh distributed across 1 ms.

No Redundancy

Latched Output Data.

Bidirectional data bus.

On-chip voltage generators

Separate I/O data buses with write-through enable pin.

During page modes, row addresses are latched for the duration of whole row access, i.e until precharge is performed, while column addresses are latched only during the actual column access.

Row is accessed first, then words in that row (or page) at a rate of one word per cycle. An extra cycle is required to go back to precharge before accessing a new row.

There is no specific Refresh cycle. Any Read or Write operation is also a refresh cycle.

Figure 11:
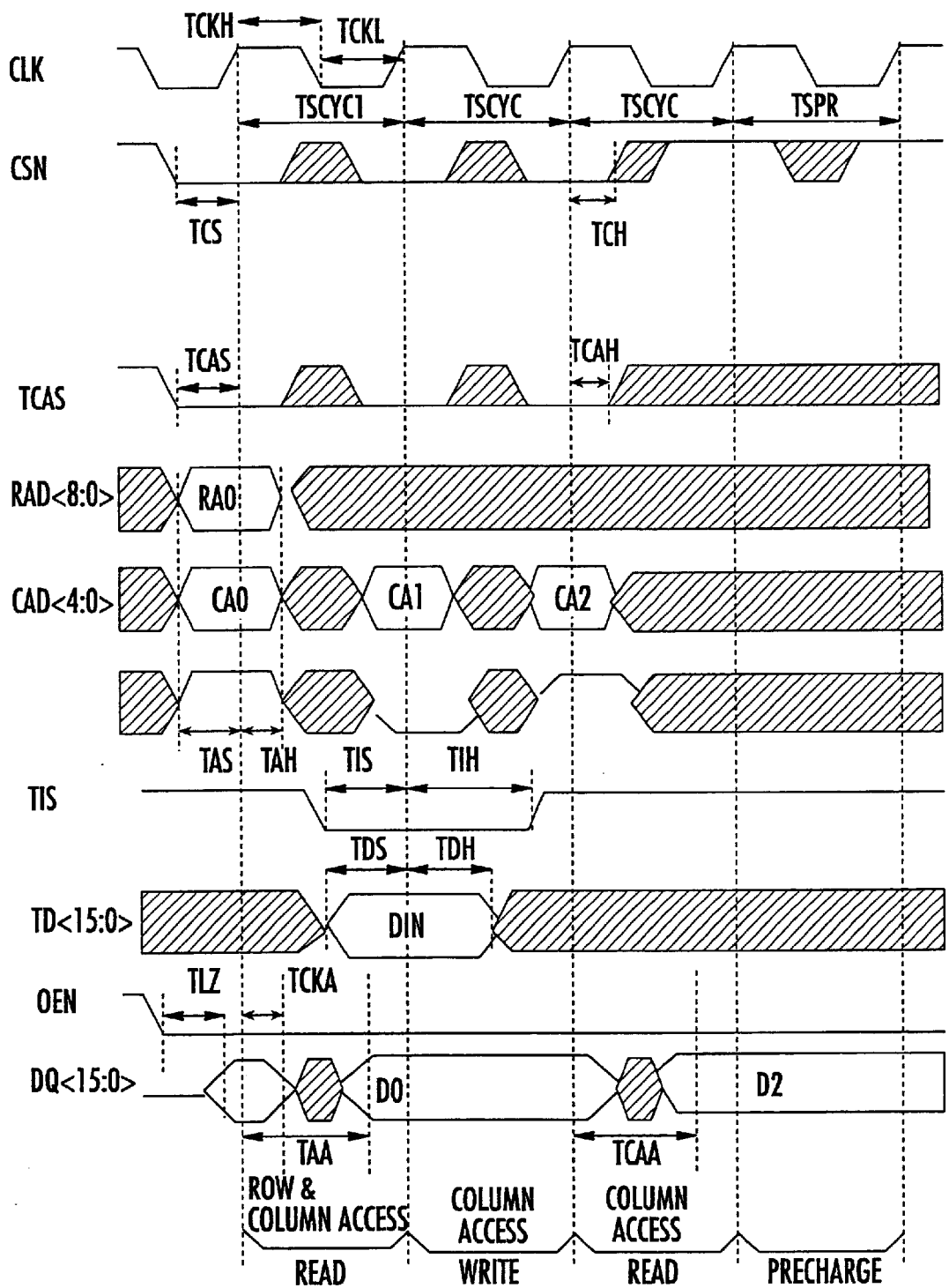
FIG. 11 shows the timing diagram of the embedded DRAM working in a synchronous page mode, for a word access in first cycle.

The timing diagram of the embedded DRAM working in a synchronous page mode, for a word access in first cycle, is shown in FIG. 11.

Figure 1:
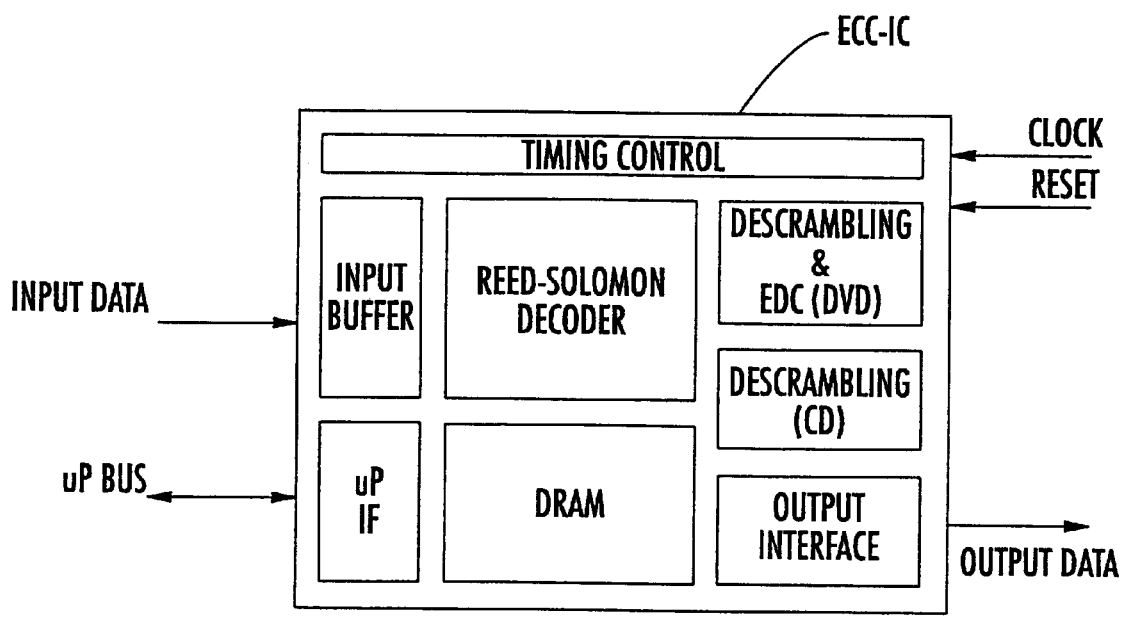
FIG. 1 is an architectural layout of the multifunctional decoder ECC-IC of the invention.
Figure 2:
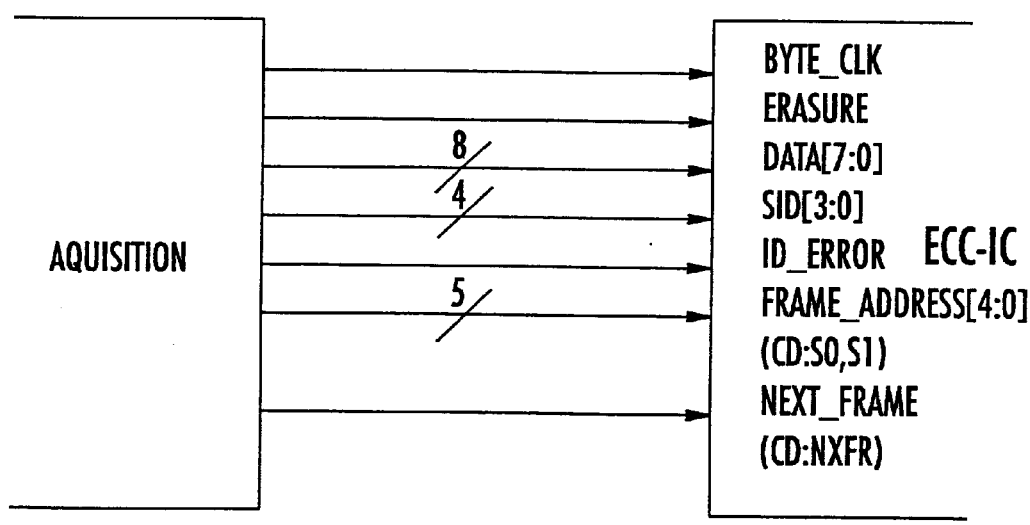
FIG. 2 shows the input data coming from a data acquisition IC.
Figure 3:
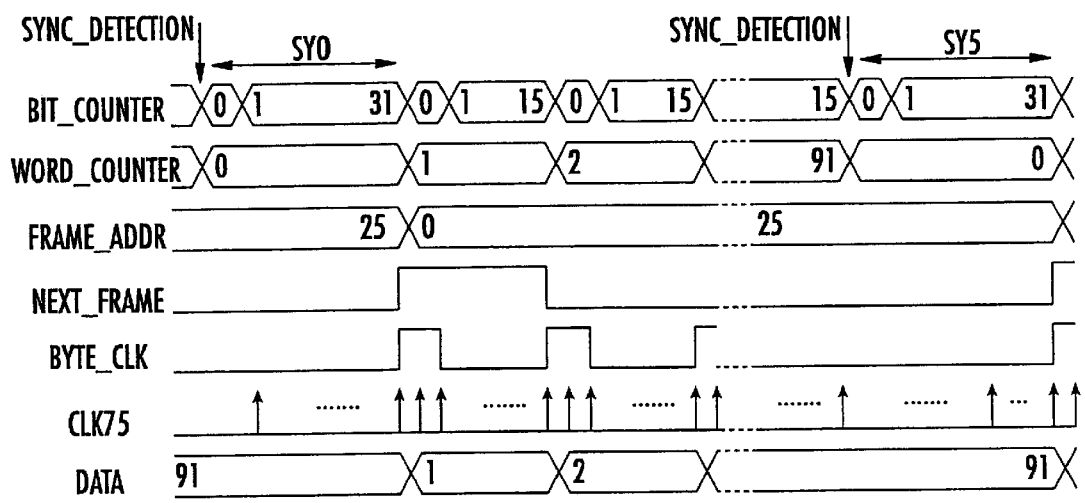
FIGS. 3 and 4 show the timing diagram of the input data acquisition for the case of operation in DVD mode and in CD mode, respectively.
Figure 4:
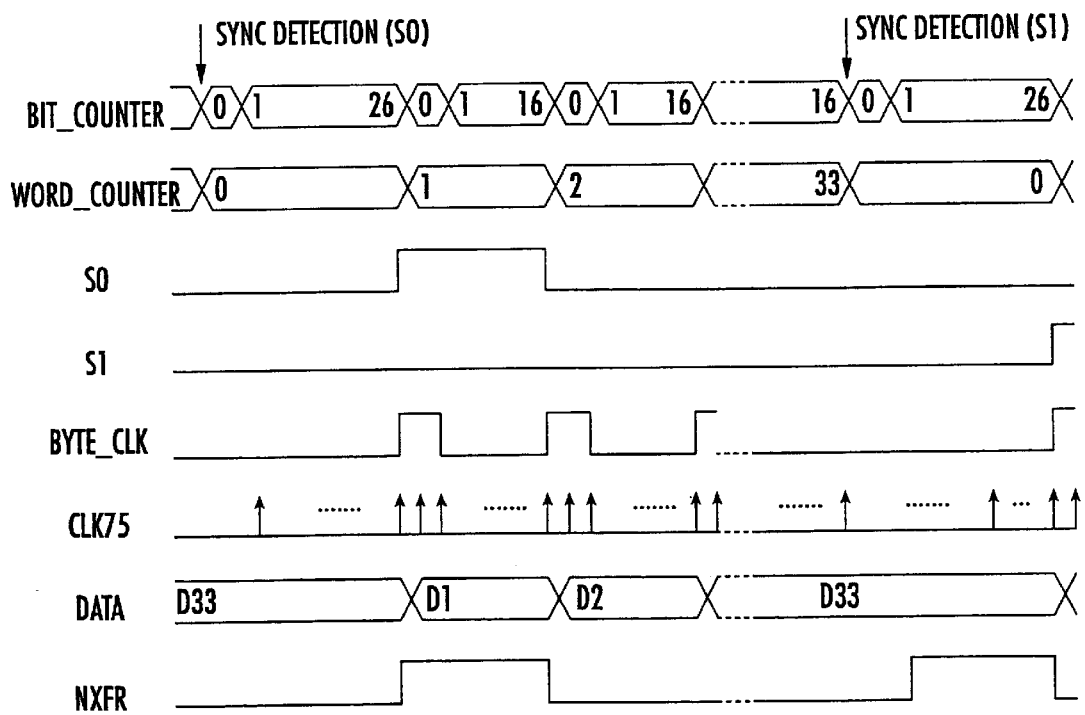
Figure 5:
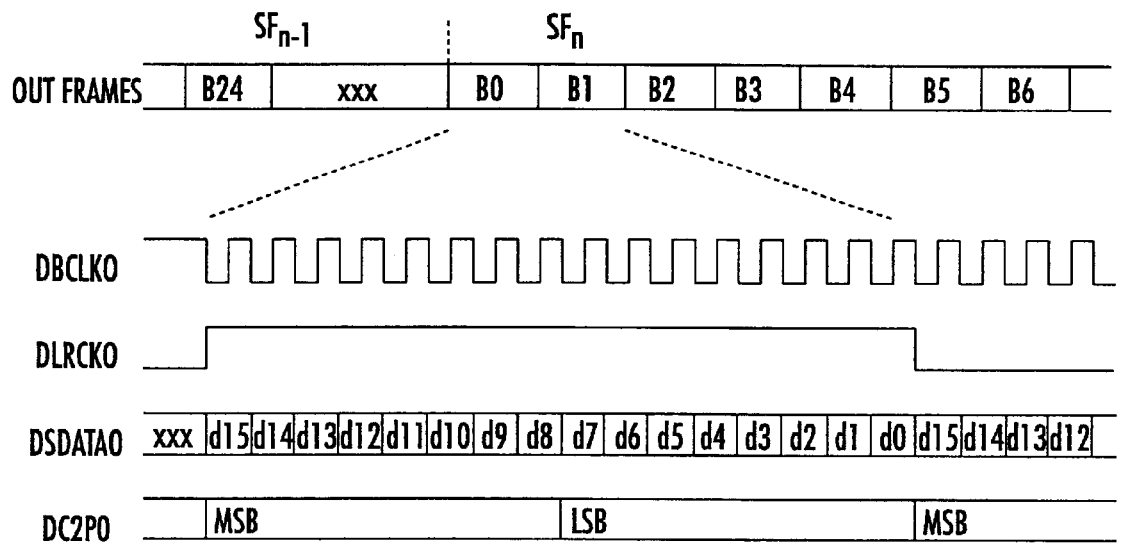
FIGS. 5 and 6 illustrate the output serial I$^2$S data interface for CD mode and the output serial subcode interface for CD mode, respectively.
Figure 6:
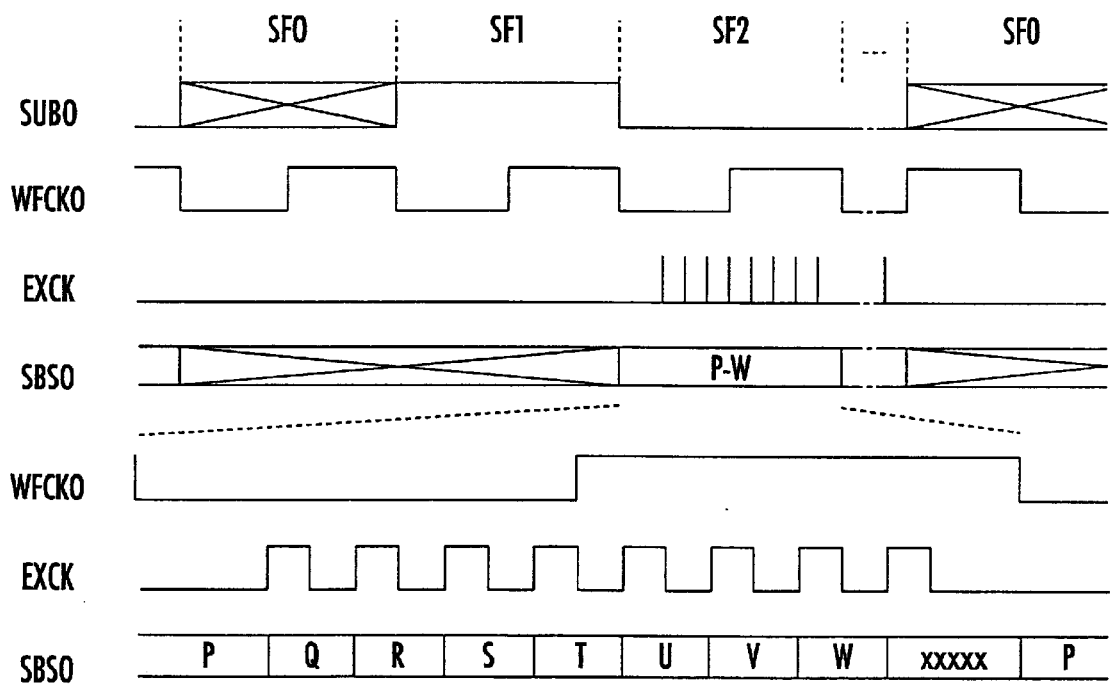
Figure 7:
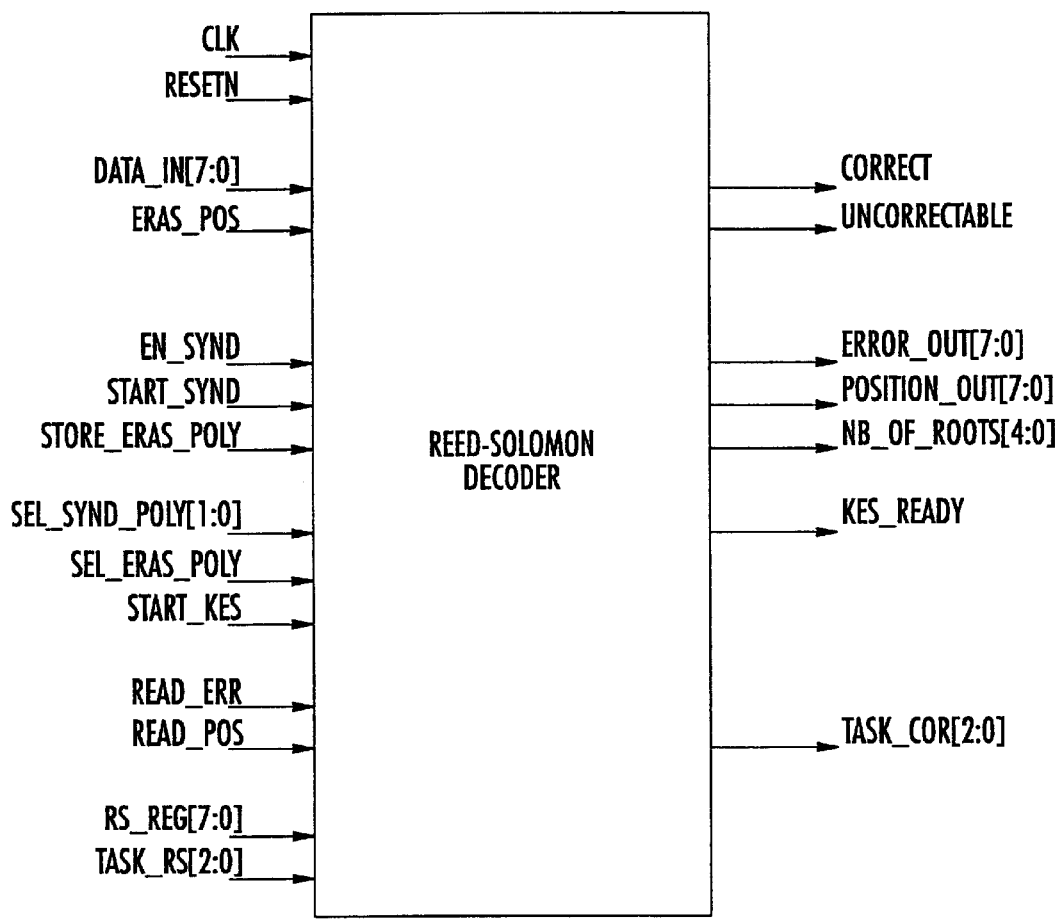
FIG. 7 represents the Reed-Solomon Decoder block.
Figure 8:
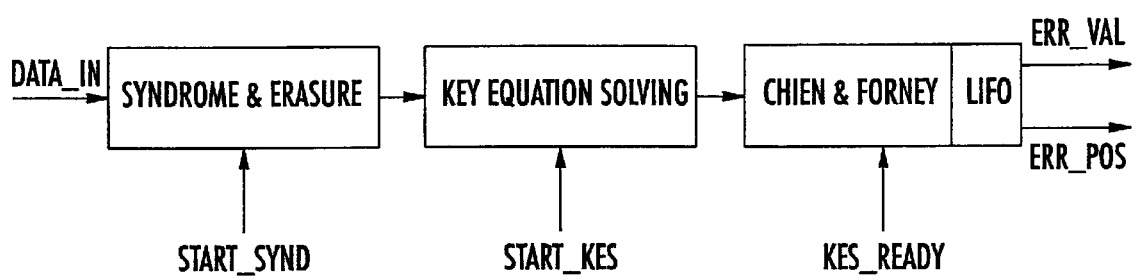
FIG. 8 schematically shows the processing performed by the Reed-Solomon Decoder.
Figure 9:
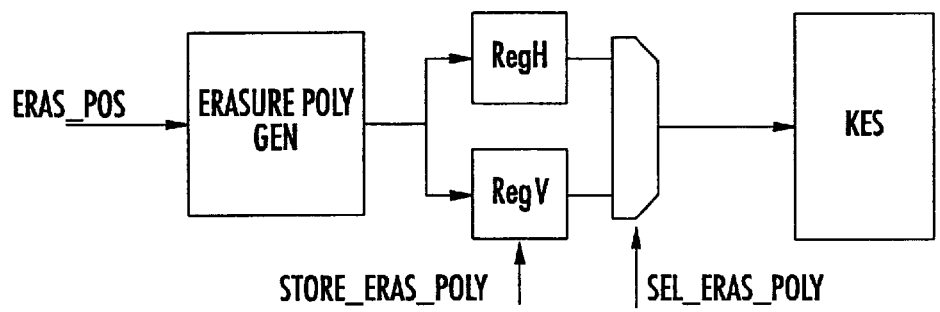
FIG. 9 schematically illustrates the processing of erasure flags during horizontal and vertical DVD decoding.

The Timing Control block is responsible of scheduling data transfer among the following functional blocks that compose the ECC-IC of FIG. 1:

Input interface

Input memory

Reed Solomon decoder

DRAM (embedded in the IC)

Descrambling and EDC checker (for DVD mode of operation only)

Descrambling (for CD modes of operation only)

Output interface

DVD Mode of Operation

Processing of data starts each time a couple of rows have been received.

The decoder ECC-IC performs the following operations:

horizontal correction of 2 rows, Ecc-block(#n).

vertical correction of 2 columns, Ecc-block(#n−1) (this operation starts only when the horizontal correction of this Ecc-block has been completed).

output of 2 rows, Ecc-block(#n−1) or Ecc-block(#n−2) (this operation starts when the vertical correction of the Ecc-block has been completed).

In order to support a sequential reading, the ECC-IC must complete the above processing before a new couple of rows is received.

The minimum time frame when operating in a DVD×4 mode is 56.875 usec (2×182/6.4 MHz).

Figure 12:
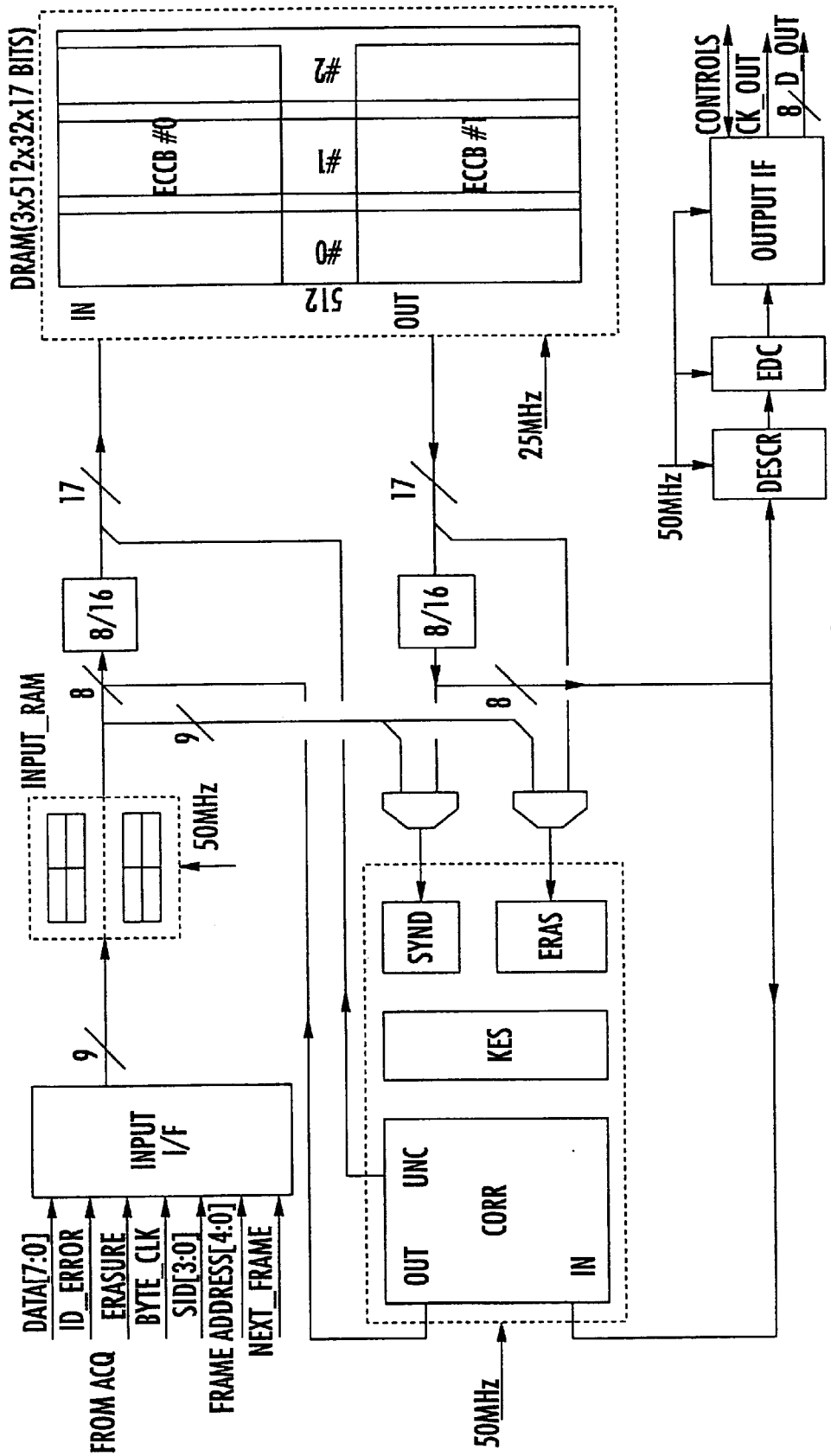
FIG. 12 shows the functional blocks of the ECC-IC device that are involved with the data flow in a DVD mode of operation.

FIG. 12 shows the functional blocks of the ECC-IC device that are involved by the data flow in a DVD mode of operation.

Normal Mode

Data and erasure flag coming from the data acquisition IC are sampled into Input interface and stored frame after frame into one of the two Input RAMs.

Each time 4 frames (equivalent to two rows) have been received, the input is switched on the second RAM; the previous rows are read from this memory and sent both to the Reed-Solomon decoding block, to calculate Inner syndromes and corresponding erasure polynomial, and to the embedded DRAM, where two complete ECC blocks of data are stored.

ECC-IC performs at the same time the Inner decoding of Ecc block #n and the Vertical decoding of Ecc block #(n−1).

Flags coming from Inner decoding are stored into DRAM to be used later in Outer decoding: for Row$_n$, the erasure flag is stored into the (Row$_n$, Col$_{182}$) word. Horizontal corrections are effected (up to 5 errors or 10 erasures) within the DRAM.

While storing rows into one Ecc block in the DRAM, columns of the previous Ecc block are being decoded. Each time a word is read from DRAM, bytes of two different columns are retrieved, therefore the syndrome engine is able to calculate syndromes of both columns at the same time.

Vertical corrections are effected (up to 8 errors or 16 erasures) within the DRAM.

When an Ecc block is completely decoded vertically, the output processing begins: data are read by rows from DRAM and sent to the descrambler block, and successively to the EDC checking block and finally to the output interface block.

Each time EDC fails, a bit is set into a register (16 bits), containing the results of each sector. At the first fail an interrupt is generated towards the $\mu$P.

Cycles are inserted to guarantee complete refreshing of the embedded DRAM.

Figure 13:
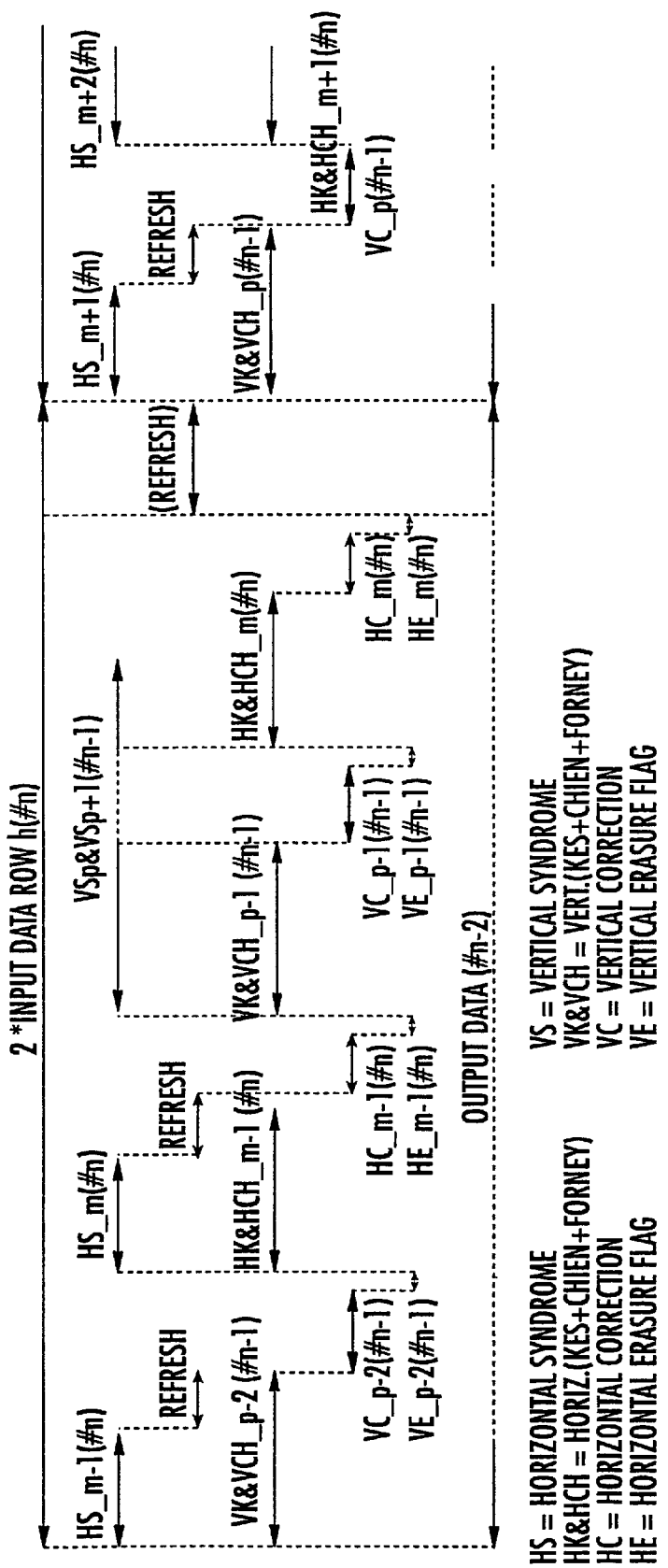
FIG. 13 illustrates schematically the different phases of processing (DVD mode)

The different phases of processing are schematized in FIG. 13.

Each Elab frame starts only when two complete rows have been received and are ready to be horizontally decoded and stored into DRAM. For this reason the byte clock should never disappear, in order to avoid arresting the internal processing.

In the time frame two new rows are received, two rows and two columns are decoded. Therefore, the Elab time frame must be shorter than twice the shortest Input data time frame (DVD×4)=2*(28.43 usec).

In view of this length of each Elab frame, the decoding core will be always waiting for the rows_ready signal. If for any reason (as for example an unlocked DPLL) the Input data frame will be shorter than Elab frame the latest stored row will be overwritten in the Input RAM by data coming from the data acquisition IC.

With a DRAM functionning in synchronous page mode, each time a new page has to be accessed, one extra cycle is needed to perform the pre-charging of the page. In one page of DRAM, 16 bytes per row and 12 bytes per column are stored: 1 row=12 pages, 1 column=18 pages. To store 2 Ecc blocks 432 pages are necessary. 32 rows are refreshed during each Elab frame.

At the end of each Elab frame, the core waits for the next two rows to decode, while refreshing the DRAM. As soon as a new couple of rows is received ready to be decoded, the process restarts.

Heroic Correction

If for any reason the output data are still affected by errors, the $\mu$P may decide to initiate a more effective decoding of a specific Ecc block of data.

The $\mu$P can decide how many iterations of decoding should be done (Inner-Outer-Inner-Outer-....-Inner-Outer); the maximum number of ECC-blocks is written in a ECC_block register, the number of iteration is written into a nb_iter register and the process is started setting another bit in the same register (HC).

Data coming from the data acquisition IC are horizontally and vertically corrected as in normal mode. The flags generated from the vertical decoding are stored into DRAM to be used as erasure flags in the horizontal decoding step of the selected Ecc-block.

At the end of the vertical decoding the ECC-block number is compared with the value written in the Ecc_block register. If the ECC-block number matches, the input is disabled and the next step of decoding takes place on this ECC-block: for Col$_n$ the erasure flag is stored into the (Row$_{208}$, Col$_n$) word.

Data are read towards the DESCRAMBLING, EDC AND OUTPUT INTERFACE blocks and, at the same time, horizontal syndromes are calculated and corrections applied within the DRAM.

At the end of the Ecc block, if any of EDC check bit is set and if the maximum number of iterations is not reached the process go ahead with another vertical decoding step and so on.

When all the EDC checks are right or when the maximum number of iterations has been reached, an interrupt is generated and the processing is stopped.

The algorithm may be expressed as follows:

STEP1: read Ecc blocks from disk. Normal decoding of data with check, after vertical step, of the Ecc-block number. No output of data during this step. This phase is repeated until the right Ecc-block number will be found. When this happens, the input of following data will be disabled.

STEP2: Output data+EDC check+Inner correction (use flag coming from outer decoding as erasure flag).

if (EDC is OK) OR (maximum number of iterations is reached)
   STOP
   else
   vertical correction
   repeat this step Long Mode If a specific bit is set into a dedicated register (longm), the ECC-IC may work in long mode: the decoding process is still active but no data correction is effected and all bytes received from acquisition (user bytes+parity bytes) are sent to the output interface.

Input RAM

Two static Ram, each one 2 rows wide (2×182×9 bits), are employed.

While data are stored into one RAM frame after frame, the previous two rows are read from the other RAM. Only when two rows are completely built, the transfer to Reed-Solomon decoder and to the embedded DRAM begins.

For each location 1 byte and its erasure flag coming from the demodulation process are stored.

Embedded DRAM 3 banks of 16K×17 bits of DRAM memory are employed. Each bank is split into 512 rows of 32 words of 17 bits.

In DVD mode the three banks are addressed as a single memory; each ECC block is stored according to the following mapping: in each page (3×32×17 bits) 16 bytes of one row and 12 bytes of one column are stored.

To store or to retrieve a complete row, 12 pages must be addressed, to read a complete column, 18 pages must be addressed.

In this mode, the 17th bit of each location becomes meaningless.

An extra-row ($Row_{208}$) and an extra-column ($Col_{182}$) are needed to store erasure flags coming from Inner and Outer decoding.

According to an important aspect of this invention, an effective mapping becomes intrumental in reducing as much as possible the number of accesses to the DRAM.

By operating in a synchronous page mode, a cycle is lost at each change of page, because a precharge cycle is normally needed.

By contrast, if when changing page the bank of DRAM is also changed, no extra cycle is needed. In practice, in writing a row, the page and also the DRAM bank are changed: every 16 bytes (bank0-bank1-bank2-bank0- . . . and so on).

Therefore, in retrieving a column from the embedded DRAM during the decoding, it is always true that a page change occurs only when changing bank (from bank2 to bank0), thus there are no extra cycles.

Extra cycles are needed only during horizontal and vertical correction, because in those operations, it may happen to be changing page while remaining in the same bank of the embedded DRAM.

Of course, also during refresh there occurs an extra cycle, because all the banks are refreshed at the same time (dummy read).

The particular mapping of the embedded DRAM for one Ecc_block of data is depicted in FIG. 14.

To store one Ecc_block 216 pages are needed. Refresh is effected only for 432 pages of the DRAM because two Ecc_blocks of data are needed for the processing.

Output Interface—DVD Modes

Decoded sectors are read from DRAM row after row, descrambled and EDC checked if needed. The pages are read from memory (max 16 bytes, min 6 bytes) and stored into the output buffer (24 bytes).

When SREQI is asserted by an ATAPI-IC, data available in this buffer are read and sent to the output.

During the processing of input data the Timing Control samples the status bit of the output buffer to be ready to store another page of decoded data read from the DRAM as soon as enough data are sent to the ATAPI-IC.

Until the Elab frame is finished, 2 rows as maximum can be trasmitted to the output buffer. Instead at the end of internal processing and during refresh cycles, as many data as required by the ATAPI-IC are sent to the output buffer. For this reason decoded ECC blocks are sent to the ATAPI-IC always at the maximum speed allowed by SREQI signal.

Figure 15:
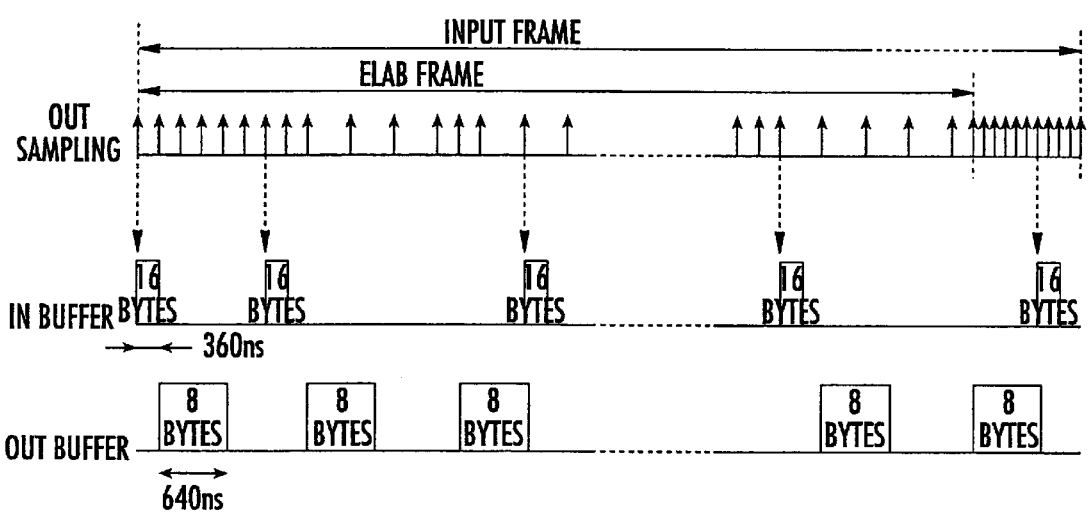
FIG. 15 illustrates the output processing.

The output process is depicted in FIG. 15.

Parallel Vertical Syndromes Computation

During vertical decoding, data are retrieved from DRAM word after word; in each word a byte belonging to one column and another belonging to the next one are identified. The Reed-Solomon decoder decodes at the same time data of the input rows and data of these columns.

Figure 16:
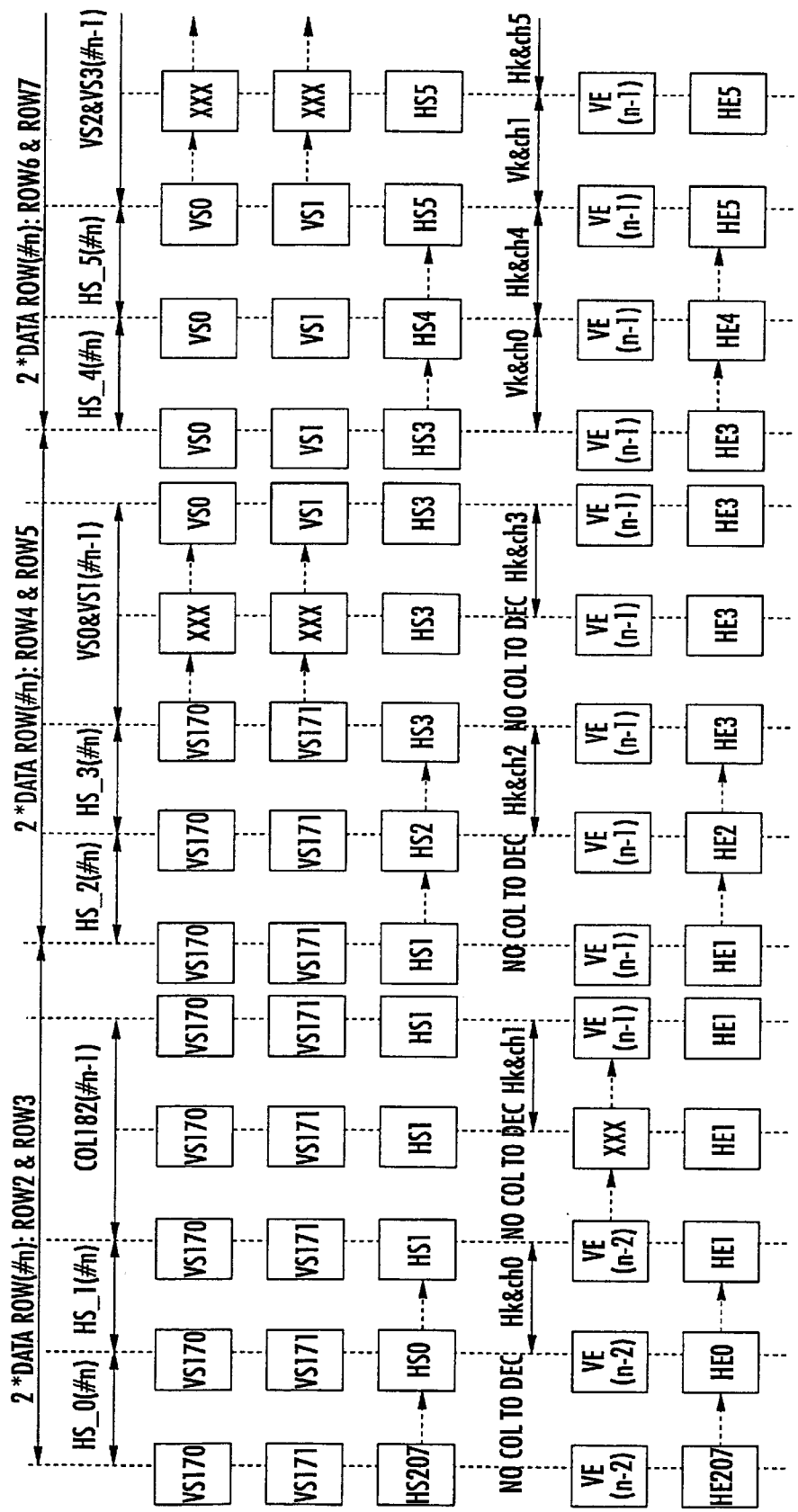
FIG. 16 illustrates the processing referred to a complete elaboration time frame, divided in four steps.

The processing is depicted in FIG. 16. The Elab frame (computation time frame) may be divided in four steps:

Step1.
   Horizontal syndrome computation (row#m, Eccb#n)
   Horizontal erasure polynomial computation (row#m, Eccb#n)
   Vertical syndrome decoding (col#p, Eccb#n−1)

Step2.
   Horizontal syndrome computation (row#m+1, Eccb#n)
   Horizontal erasure polynomial computation (row#m+1, Eccb#n)
   Horizontal syndrome decoding (row#m, Eccb#n)

Step3.
   Vertical syndromes computation (col#p+2,p+3, Eccb#n−1) (to be continued)
   Vertical syndrome decoding (col#p+1, Eccb#n−1)

Step4.
   Vertical syndromes computation (col#p+2, p+3, Eccb#n−1)
   Horizontal syndrome decoding (row#m+1, Eccb#n)

During step3 and step4, the first column of the Eccb#n−1 to be read from DRAM is $Col_{182}$, containing the erasure flags from horizontal decoding from which the vertical erasure polynomial is updated and stored too.

CD Modes of Operation

Figure 17:
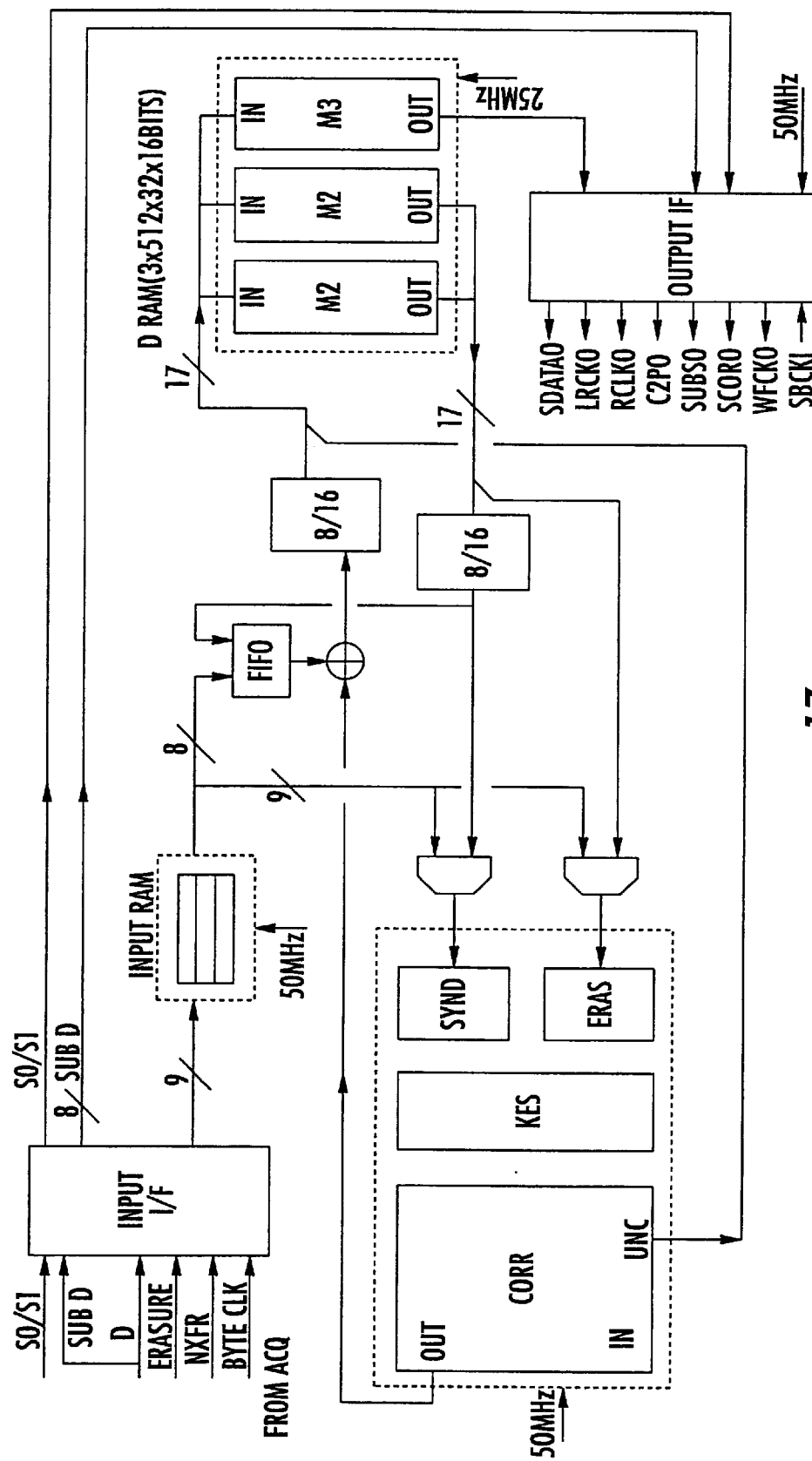
FIG. 17 shows the functional blocks of the ECC-IC device that are involved with the data-flow for the case of a CD mode of operation.

The functional circuit blocks of the ECC-IC involved into CD data flow are shown in FIG. 17.

In CD-modes the 3 banks of the embedded DRAM are used as three different memories: M2-deinterleaving is carried out in two of the banks, while M3-deinterleaving is performed in the third bank.

Data received from the data acquisition IC is stored into Input RAM (user data) or sent to output interface (subcode data and sync). For each F3 frame 32 bytes of user data are stored, each one with its erasure flag.

Figure 18:
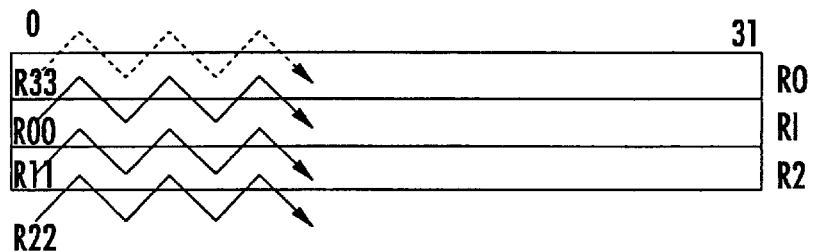
FIG. 18 illustrates the first step of the deinterleaving (M1-deinterleaving) of input data.

The first step of the deinterleaving (M1-deinteleaving) takes place into the Input RAM according to the sheme of FIG. 18.

Data are read from this memory deinterleaved, sent to Reed-Solomon decoder and stored into the correction FIFO. In this step the Reed-Solomon core calculates the C1 syndrome of the input frame.

Figure 19:
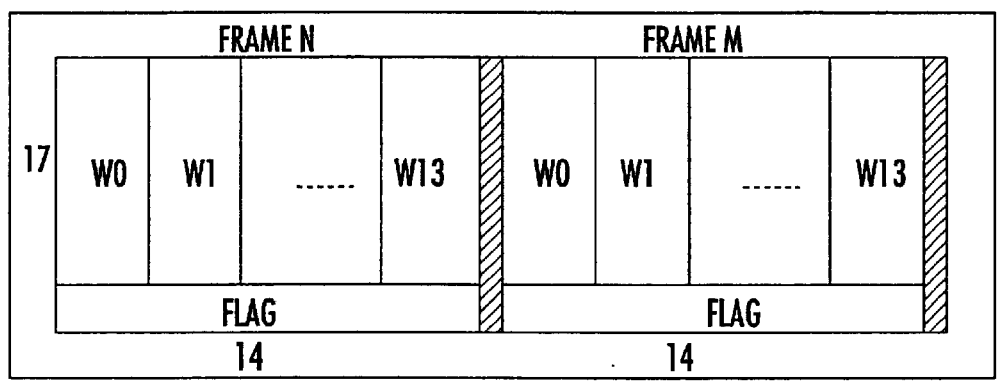
FIG. 19 illustrates the particular mapping inside a page of the embedded DRAM (M2-deinterleaving)

Meanwhile, the previous frame stored into the FIFO is corrected on the fly and stored into the two banks (DRAM1, DRAM2) of the DRAM, organized in 512 pages of 32*17 bits each, according to a mapping as schematized in FIG. 19: the 28 bytes frames are stored in one DRAM page together with its C1 decoding flag. In a page of one bank of DRAM two 28 bytes-frame can be stored. The M2-deinterleaving takes place in these two banks of DRAM.

According to an important aspect of this invention, an effective addressing of the incoming frames together with the mapping of FIG. 19 becomes instrumental in reducing as much as possible the number of accesses of the DRAM, allowing to perform a very high speed M2-deinterleaving. 112 frame need to be stored in the two banks, requiring 28 pages of DRAM1 and DRAM2: therefore only these pages need to be refreshed.

Tab. 1 in FIG. 20B shows the content of the two banks (DRAM1, DRAM2) after 112 frames have been received. Depending on the circular approach chosen, frame#113 and frame #121 will be stored in page#0 of DRAM1 and so on.

Functioning in a synchronous page mode, the embedded DRAM needs a cycle for precharge each time a new page is addressed.

Frames coming from the correction FIFO are corrected on the fly and stored in DRAM1 or into DRAM2: 32 corrected bytes are read from the FIFO but only 28 bytes are stored into DRAM, because the parity bytes can be discarded.

The operations performed when a frame is written into the right DRAM bank are:

select the right bank and the right page
write 14 words (17 bits) into the memory
To write a complete frame we need (1+14)cycles.

Data for C2 syndrome calculation (28 bytes+flags) are read from M2 memory: the new mapping of the data allows to reduce the number of accesses of the DRAM needed to retrieve both deinterleaved data and correspondent flags.

Figure 20A:
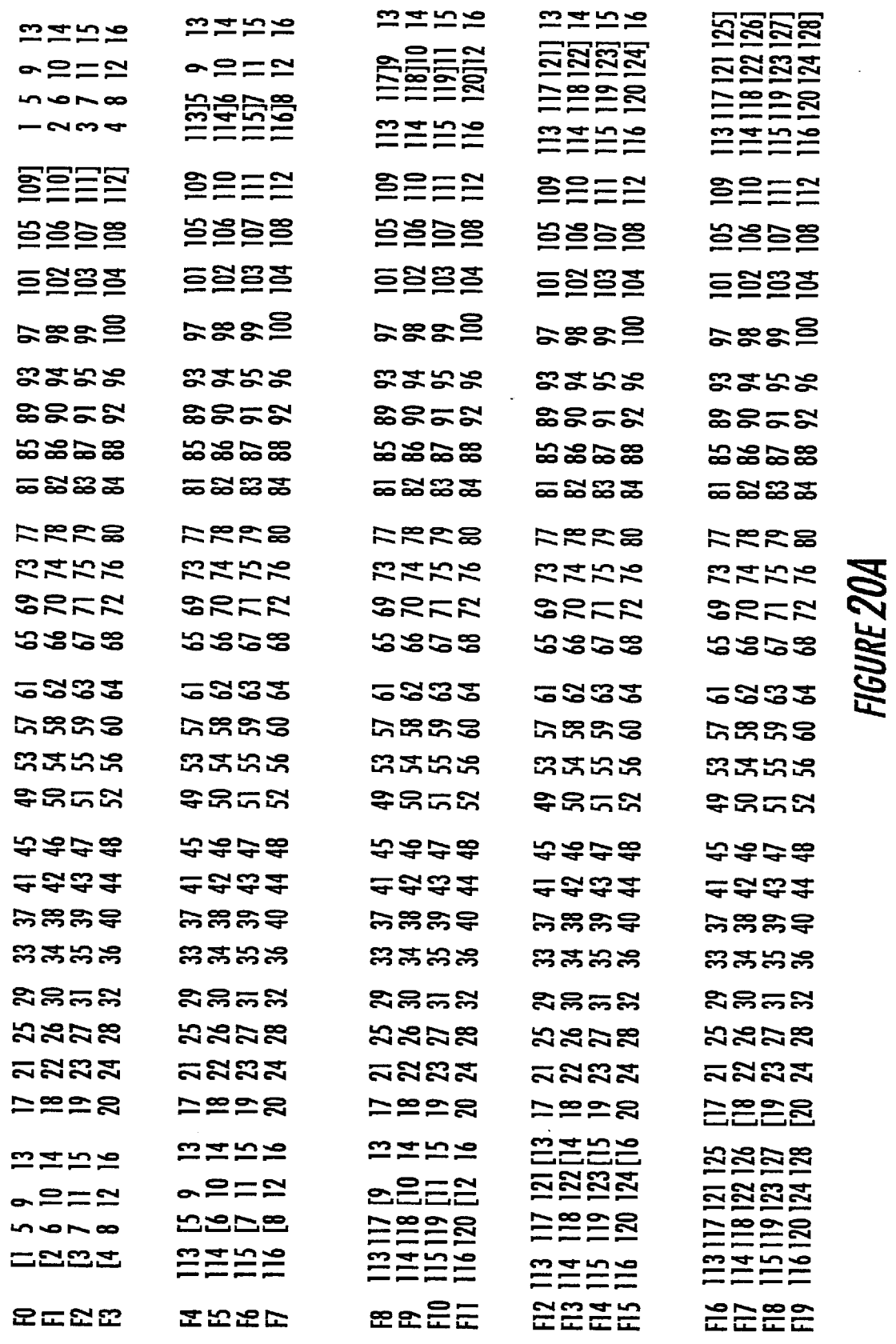

FIG. 20A shows that to retrieve a complete deinterleaved frame (1+2)*8=24 DRAM cycles are needed. In fact, to read a deinterleaved frame, 8 pages are addressed and 32 bytes retrieved: only 28 bytes are significant.

Firstly, the page where to start from must be decided, according to $$firstPAGE = 4\left\lfloor \frac{frame}{16} \right\rfloor \mod(28) + frame \mod(4)$$

where "frame" stands for the frame number.

From each selected page 4 bytes in 2 cycles are read, two from DRAM1, two from DRAM2: for example, if page#0 is selected, in the first cycle a byte from frame#1 (DRAM1) and one from frame #5 (DRAM2) are read, in the second cycle a byte from frame #3 (DRAM1) and one from frame #9 (DRAM2) are read.

Every time 1 bytes from a page are retrieved, the page number is incremented according to nextPAGE=(PAGE+4) mod(28)

At this point, from the 32 bytes read, the 28 significant bytes are chosen: they are always consecutive but the first significant byte change position each 4 frames, still remaining in the first selected page.

$$firstBYTE = \left\lfloor \frac{frame \mod(16)}{4} \right\rfloor$$

The enable signal is shown in FIG. 21, according to the different frame numbers. The waveform of this signal repeats itself every 16 frames.

M2-deinterleaved data are read from DRAM, sent to the Reed-Solomon decoder and stored into the correction Fifo again. In this step the Reed-Solomon core calculates the C2 syndrome.

The previous frame stored into the Fifo is corrected "on the fly" and stored into the M3 memory bank. Deinterleaved data are read from the M3 bank and sent to the output interface.

The third step of deinterleaving is done into the third bank (M3) of DRAM, organized in 512 pages of 32*17 bits each, by using only two pages for the process.

To perform this third step of deinterleaving four frames coming from C2 decoding are stored, each byte coming with its flag of correct/incorrect decoding.

First of all, two bytes are packed in one word ready to be written into M3, therefore for each couple of bytes only 1 flag in 17th position is written.

The mapping of the M3 DRAM memory is shown in FIG. 22.

The operations performed when a frame is written into the M3 memory are:

select the right page
write 12 words (17 bits) into the memory
To write a complete frame we need (1+12) cycles The operations performed when a frame is read from the M3 memory are:

select the right page
read 12 words (17 bits) from the memory, two words from frame (N) then two words from frame (N−2)
To read a complete frame we need (1+12) cycles.

The Elab_frame is illustrated in FIG. 23.

The elaboration time frame must be shorter than the shortest Input time frame (for CD×32 rate it is of 4.25 usec).

The Elab frame start only if there is a new F2-frame to be decoded.

The C1-syndromes update time depends from the speed of the disk, because the Input memory is shared between the input process and the CIRC decoding.

The refresh of twenty eight pages is done at the same time on the three banks of the DRAM.

At the end of an Elab frame refresh cycles are inserted until a new F2-frame is ready for decoding.

Output of Data in CD Modes

Data are read from the third bank of the DRAM (M3), frame after frame, and are sent to the CD-descrambler (if enabled) and to output interface.

One block of 12 words is read from memory for each input frame as illustrated in FIG. 24. Each byte read from DRAM is sent to the output buffer.

BCA Mode Operation

BCA is an area for recording information after finishing disc manufacturing process. The data in the BCA-Code consists of a BCA-preamble field, a BCA-Data field and a BCA-Postamble field. The length of BCA-Data field is (16n−4) bytes, with $1 \leq n \leq 12$. These bytes are encoded with a Reed-Solomon code (52,48,5) and protected by a 32 bits CRC.

FIG. 25 shows the functional blocks of the ECC-IC device that are involved by the data flow in a BCA mode of operation.

A SRAM (364×9 bits) is used for storing the incoming data. The sync information is carried by frame_addr[4:0].

Data are stored into Input RAM to reconstruct the complete block. When the last sync ($RS_{BCA15}$) or the postamble pattern is received, the decoding process starts.

Bytes are sent to the embedded DRAM and to the Reed-Solomon decoder to calculate the syndromes of the four code words. During this transfer, zeroes are inserted to fit the code word length (if required). All the bytes (information+parity bytes=4*(48+4)bytes) are stored into DRAM, following the same addressing scheme as in DVD-modes: code word 0 is equivalent to Row0, code word 1 to Row1, code word 2 to Row2, code word 3 to Row3. The mapping is illustrated in FIG. 26. Only 4 pages of DRAM need to be refreshed.

Corrections are applied into the DRAM.

Data are read towards the EDC checker to test the result of the decoding. The EDC flag is stored into an edc_register [0].

The end of processing is signalled to $\mu$P by interrupt. The $\mu$P will take care of transferring data to the ATAPI buffer.

The Elab frame in BCA modes is illustrated in FIG. 27.
Acquisition and Timing Control—BCA Heroic-mode If sync detection problems are experienced in the acquisition of data, the $\mu$P may decide to do the demodulation of BCA by firmware. Setting the HC bit in $\mu$P interface, data received from the data acquisition IC are simply stored into the Input RAM. When the last byte is received, the $\mu$P begins to read all the blocks from this memory. After carring out demodulation and formatting of the data blocks, data are written back to Input RAM and the decoding process starts (as in normal BCA mode) when the Start bit in the $\mu$P interface is set by the $\mu$P.

DVD Descrambler

Data are descrambled just before reaching the EDC checker and Output interface. Bytes coming from the embedded DRAM after Reed-Solomon decoding are descrambled "on the fly" and then passed to the EDC checker.

The basic descrambling operation is to forward one byte unchanged if it does not belong to the main data area, or to perform another XOR operation with the right scrambling value to retrieve the original data. The scramble value must be generate internally.

Each already error-corrected and deinterleaved data sector is treated separately (during descrambling), sequentially byte after byte (as part of an entire Ecc_block of data).

The overall architecture of the Descrambler for DVD mode is depicted in FIG. 28.

The main input is the sequential stream of data bytes. The row and column indexes of the current input data byte are needed for algorithm control. From such information principally the Sector_start (first byte of a new data sector) and the Block_start (first byte of a new Ecc block) must be retrieved.

The Desclamber is provided with the 50 MHz master clock and with a data_enable signal indicating that an input data has to be processed.

The main output is a stream of descrambled bytes, accompanied by control signals necessary for the EDC checker and output interface.

The Descrambler processes only DVD-data, depending on the format of the input data. In the other modes of operation, the data bytes are simply conveyed to the output.

CD Descrambler

Data (not audio) coming from CIRC decoding must be descrambled before going to C3 decoding. This operation may be done inside ECC-IC or in an ATAPI-IC. A bit written in a register (en_des) enables/disables this function.

The incoming byte are xored with a scramble value generated by a FSR, as shown in the functional block diagram of FIG. 29.

The 15-bit register is of the parallel-block synchronized type and fed back according to the polynomial $x^{15}+x+1$.

After the Sync of the sector (0x00, 0xFF ten times, 0x00) has been found, the register is preset with the value 0x0001, where 1 is the least significant bit. A symbol counter will count 2340 bytes to be descrambled.

Each time a Sync pattern is detected a preset is generated (the Sync window is always active) and the counter reset to 2340 (Short Sectors).

Each time the counter reaches zero, a preset signal is generated anyway, even if no Sync pattern is found. The counter is reset to 2340 (Long Sector).

Each time a new byte is read, the FSR value St[15:0] is updated as follows:

$S_{t+1}[\mathbf{15}]=S_t[8] \text{xor} S_t[7]$
$S_{t+1}[\mathbf{14}]=S_t[7] \text{xor} S_t[6]$
$S_{t+1}[\mathbf{13}]=S_t[6] \text{xor} S_t[5]$
$S_{t+1}[\mathbf{12}]=S_t[5] \text{xor} S_t[4]$
$S_{t+1}[\mathbf{11}]=S_t[4] \text{xor} S_t[3]$
$S_{t+1}[\mathbf{10}]=S_t[3] \text{xor} S_t[2]$
$S_{t+1}[\mathbf{9}]=S_t[2] \text{xor} S_t[1]$
$S_{t+1}[\mathbf{8}]=S_t[1] \text{xor} S_t[0]$
$S_{t+1}[\mathbf{7:0}]=S_t[\mathbf{15:8}]$ EDC Checker The EDC is a CRC check which, in DVD-mode, is applied to the sectors after the descrambling has been performed. In BCA mode the EDC check is effected to test the result of decoding.

BCA Mode

A decoded BCA block consists of 16×n bytes with $1 \leq n \leq 12$. The last four bytes are parity bytes, obtained dividing the information bits by the generator polynomial:

$$g(x)=x^{32}+x^{31}+x^4+1$$

At the beginning of each block a start signal resets the EDC value to zero. With each enable signal, data is read from the embedded DRAM to the EDC.

The current value of EDC is updated each time a new byte is received.

After 192 bytes the check is stopped and a result flag is set to zero if the check was satisfactory. Otherwise this flag is set to 1. The EDC doesn't change the data in any case.

The result flag of the block is stored into a register edc_reg[0], and an interrupt is generated towards the µP to signal the end of BCA processing.

The µP will take care to read the decoded bytes from internal DRAM to an ATAPI buffer.

DVD Mode

Each sector consists of 12 rows*172 bytes. The EDC checker gives a correct check if the error-correction has performed well. Of course, this check has no 100% safety, but a high probability that incorrect data be recognized.

At the beginning of each sector, the start signal resets the EDC value to zero. With each enable signal data is shifted from the DVD Descrambler to the EDC checker.

The current value of EDC is updated each time a new byte is received.

After 2064 bytes the check is stopped and the result flag is set to zero if the check was satisfactory. Otherwise this flag is set to 1.

All the result flags of the sectors inside an Ecc_block of data are stored into a register edc_reg[15:0]; when the first EDC failure occurs, an interrupt is generated towards the µP; the content of this register will be reset when the first byte of the next Ecc_block will be output.

A functional block diagram of the EDC Checker is shown in FIG. 30.

Four bytes are attached to 2060 bytes in a data sector. Let's suppose that the MSB of the first byte of the sector is b16511 and the LSB of the last byte of EDC is b0.

The generator polynomial of the code is $$g(x)=x^{32}+x^{31}+x^4+1$$

and the information polynomial is $$I(x) = \sum_{i=16511}^{32} b_i x^i$$

The implemented algorithm works directly on bytes. This allows to reduce the frequency of the clock needed in this processing.

An internal ROM storing 8 words of 32 bits is used to update the CRC value each time a new byte is received. The stored values are obtained as remainder of the division $$W_i = R\left(\frac{x^{32+i}}{g(x)}\right)$$

calculated in GF(2).

At the beginning of the sector the value of CRC is initialized to 0x0000. The input byte is xored with the most significant byte of the current CRC value: each "1" in the resulting byte enables one stored value; all the enabled bytes are xored to give an updating value. The new CRC value is obtained shifting the old one and xoring the result with the updating value. This processing is illustrated in the diagram of FIG. 31.

What is claimed is:

1. A method of organizing and transferring data among functional blocks of an integrated system of a read channel for data recorded on DVD-Rom, DVD-Ram, and DVD-R for performing Reed Solomon decoding including off-line heroic correction, the integrated system including an input buffer, an interface with a microcontroller bus, a Reed-Solomon decoder, an embedded RAM accessed through a 17-bit bus, a descrambling and EDC control block for DVD modes of operation, a data output interface and a timing control block, wherein the decoding of input data acquired through the input buffer is performed at a rate of up to four-times a reference bit rate of DVD formatted data using a clock for accessing the embedded RAM having a frequency which is half that of the clock that is used in the Reed-Solomon decoder, while reducing the number of accesses to the embedded RAM needed to perform the decoding, the method comprising the steps of:
   a) organizing DVD mode input data in two blocks or rows of 182 bytes each;
   b) storing each block or row in 12 pages of distinct banks in which the embedded RAM is divided, functioning in a synchronous page mode, each bank being split into 512 pages of 32 words of 17 bits, by organizing bytes into words of 16 bits, sequentially readable therefrom without waiting for any precharge cycle;
   c) simultaneously decoding two input blocks or rows in the Reed-Solomon decoder, while correcting errors and storing decoding flags in the embedded RAM;
   d) refreshing the embedded RAM while the decoding of two blocks is in progress; and
   e) decoding two columns of 208 bytes each of the stored blocks or rows by reading columns word by word from the embedded RAM and performing parallel Reed-Solomon decoding on two columns at a time in the Reed-Solomon decoder, while correcting errors and storing decoding flags in the embedded RAM.

2. A method of organizing and transferring data among functional blocks of an integrated system of a read channel for data recorded on a CD Rom for performing deinterleaving, decoding and correction, the integrated system including an input buffer, an interface with a microcontroller bus, a Reed-Solomon decoder, an embedded RAM accessed through a 17-bit bus, a descrambler, a data output interface and a timing control block, wherein the processing of the input data acquired through the input buffer is performed at a rate of up to 32 times a reference bit rate of CD formatted data using a clock for accessing the embedded RAM having a frequency which is half that of the clock that is used in the Reed-Solomon decoder, while reducing the number of accesses to the embedded RAM needed to perform the processing, the method comprising the steps of:
   a) sorting CD mode frames of input data including erasure flags in the input buffer and conveying subcode and sync data to the output interface;
   b) performing a first step of deinterleaving in the input buffer while reading frames of input data therefrom, inputting the frames to the Reed-Solomon decoder that calculates a C1 syndrome and storing the data frames in a correction fifo buffer while correcting errors on the fly of a previously stored frame and storing it in two banks of the embedded RAM;
   c) performing a second step of deinterleaving in the two banks of three distinct banks in which the embedded RAM is divided, functioning in a synchronous page mode, each bank being split into 512 pages of 32 words of 17 bits, by organizing bytes and C1-decoding flags into words of 17 bits, by storing data in 28 pages with a new addressing scheme, subject to refreshing, each page containing two of the frames, by reading frames of deinterleaving data and flags from the two banks, inputting the frames to the Reed-Solomon decoder that calculates a C2 syndrome and storing the data frames in a correction fifo buffer while correcting errors on the fly of a previously stored frame and storing it in a third bank of the embedded RAM;

d) performing a third and final step of deinterleaving in the third one of the three distinct banks in which the embedded RAM is divided, using two pages for the process, including reading four frames of deinterleaved data from the two banks, each byte with its own flag of correct/incorrect decoding, and packing two bytes in one word to be written in the third bank of the embedded RAM;

e) refreshing 28 pages of each of the three banks of embedded RAM simultaneously while a processing of one frame is in progress; and f) reading frames from the third bank of the embedded RAM and inputting them to the descrambler toward the output interface.

3. A method of organizing and transferring data among functional blocks of an integrated system of a read channel for data recorded on at least one of DVD-Rom, DVD-Ram, and DVD-R for performing Reed Solomon decoding including off-line heroic correction, the integrated system including an input buffer, an interface with a microcontroller bus, a Reed-Solomon decoder, an embedded RAM divided into banks, a descrambling and error data correction control block for DVD modes of operation, a data output interface and a timing control block, wherein the decoding of input data acquired through the input buffer is performed at a higher rate than a reference bit rate of DVD formatted data using a clock for accessing the embedded RAM having a frequency which is a fraction of the frequency of the clock that is used in the Reed-Solomon decoder, while reducing the number of accesses to the embedded RAM needed to perform the decoding, the method comprising the steps of:

a) organizing DVD mode input data in blocks;

b) storing each block in a plurality of pages of the banks in which the embedded RAM is divided, for functioning in a synchronous page mode, each bank being split so into the plurality of pages of words of bits, by organizing bytes into words of bits, sequentially readable therefrom without waiting for any precharge cycle;

c) decoding two input blocks in the Reed-Solomon decoder, while correcting errors and storing decoding flags in the embedded RAM;

d) refreshing the embedded RAM while the decoding of two blocks is in progress; and e) decoding two columns of bytes each of the stored blocks by reading columns word by word from the embedded RAM and performing parallel Reed-Solomon decoding on two columns at a time in the Reed-Solomon decoder, while correcting errors and storing decoding flags in the embedded RAM.

4. A method of organizing and transferring data among functional blocks of an integrated system of a read channel for data recorded on a CD Rom for performing deinterleaving, decoding and correction, the integrated system including an input buffer, an interface with a microcontroller bus, a Reed-Solomon decoder, an embedded RAM divided into banks, a descrambler, a data output interface and a timing control block, wherein the processing of the input data acquired through the input buffer is performed at a higher rate than a reference bit rate of CD formatted data using a clock for accessing the embedded RAM having a frequency which is a fraction of the frequency of the clock that is used in the Reed-Solomon decoder, while reducing the number of accesses to the embedded RAM needed to perform the processing, the method comprising the steps of:

a) sorting CD mode frames of input data including erasure flags in the input buffer and conveying subcode and sync data to the output interface;

b) performing a first step of deinterleaving in the input buffer while reading frames of input data therefrom, inputting the frames to the Reed-Solomon decoder that calculates a C1 syndrome and storing the data frames in a correction fifo buffer while correcting errors on the fly of a previously stored frame and storing it in two banks of the embedded RAM;

c) performing a second step of deinterleaving in the two banks of the embedded RAM, while functioning in a synchronous page mode, each bank being split into a plurality pages of words of bits, by organizing bytes and C1-decoding flags into words of bits, by storing data in pages with a new addressing scheme, subject to refreshing, each page containing two of the frames, by reading frames of deinterleaving data and flags from the two banks, inputting the frames to the Reed-Solomon decoder that calculates a C2 syndrome and storing the data frames in a correction fifo buffer while correcting errors on the fly of a previously stored frame and storing it in a third bank of the embedded RAM;

d) performing a third step of deinterleaving in the third bank of the embedded RAM, using two pages for the process, including reading four frames of deinterleaved data from the two banks, each byte with its own flag of correct/incorrect decoding, and packing two bytes in one word to be written in the third bank of the embedded RAM;

e) refreshing pages of each of the three banks of embedded RAM simultaneously while a processing of one frame is in progress; and f) reading frames from the third bank of the embedded RAM and inputting them through the descrambler to the output interface.

* * * * *

UNITED STATES PATENT AND TRADEMARK OFFICE
CERTIFICATE OF CORRECTION

PATENT NO.    : 6,594,794 B1                                          Page 1 of 1
DATED         : July 15, 2003
INVENTOR(S)   : De Marzi et al.

It is certified that error appears in the above-identified patent and that said Letters Patent is hereby corrected as shown below:

<u>Title page,</u>
Item [56], References Cited, U.S. PATENT DOCUMENTS insert
-- 5,631,914    5/1997        Kashida et al.   371/37.4
5,691,994       11/1997       Acosta et al.    371/40.1 --
Insert
-- FOREIGN PATENT DOCUMENTS
  0 821 493 A1 7/1997  EP --
Insert
-- OTHER PUBLICATIONS
Yamauchi, Hideki et al., A 24X-SPEED CIRC
DECODER FOR A CD-DSP/CD-ROM
DECODER LST, June 13, 1997, pages 483-490. --

Signed and Sealed this

Second Day of December, 2003

JAMES E. ROGAN
*Director of the United States Patent and Trademark Office*